United States Patent
Matsuo et al.

(10) Patent No.: US 12,428,334 B2
(45) Date of Patent: Sep. 30, 2025

(54) ALKALI-FREE GLASS AND GLASS PLATE

(71) Applicant: AGC Inc., Tokyo (JP)

(72) Inventors: Yusaku Matsuo, Tokyo (JP); Hiroyuki Hijiya, Tokyo (JP); Yuya Hamada, Tokyo (JP); Yutaka Kuroiwa, Tokyo (JP)

(73) Assignee: AGC Inc., Tokyo (JP)

( * ) Notice: Subject to any disclaimer, the term of this patent is extended or adjusted under 35 U.S.C. 154(b) by 79 days.

(21) Appl. No.: 18/173,378

(22) Filed: Feb. 23, 2023

(65) Prior Publication Data

US 2023/0202907 A1  Jun. 29, 2023

Related U.S. Application Data

(63) Continuation of application No. PCT/JP2021/031258, filed on Aug. 25, 2021.

(30) Foreign Application Priority Data

Aug. 27, 2020 (JP) .................. 2020-143080
Jan. 25, 2021 (JP) .................. 2021-009791

(51) Int. Cl.
  *C03C 3/091* (2006.01)
  *C03C 4/16* (2006.01)

(52) U.S. Cl.
  CPC .............. *C03C 3/091* (2013.01); *C03C 4/16* (2013.01)

(58) Field of Classification Search
  CPC .................. C03C 3/091; C03C 4/16
  See application file for complete search history.

(56) References Cited

U.S. PATENT DOCUMENTS

| 2019/0210911 A1 | 7/2019 | Ono et al. |
| 2020/0123043 A1 | 4/2020 | Ono et al. |
| 2020/0231490 A1* | 7/2020 | Boek ............ C03C 3/091 |
| 2020/0299179 A1 | 9/2020 | Hirose et al. |
| 2021/0139368 A1 | 5/2021 | Nakamura et al. |
| 2021/0163341 A1 | 6/2021 | Ono et al. |
| 2021/0363051 A1 | 11/2021 | Tokunaga et al. |
| 2021/0380466 A1 | 12/2021 | Tokunaga et al. |
| 2021/0387897 A1 | 12/2021 | Tokunaga et al. |
| 2021/0395134 A1 | 12/2021 | Boek et al. |

FOREIGN PATENT DOCUMENTS

| JP | 64-51345 A | 2/1989 |
| JP | 2010-30848 A | 2/2010 |
| JP | 2011-68549 A | 4/2011 |
| JP | 2019-77612 A | 5/2019 |
| JP | 2020-33258 A | 3/2020 |
| WO | WO 2018/051793 A1 | 3/2018 |
| WO | 2020/150422 A1 | 7/2020 |
| WO | WO 2020/162606 A1 | 8/2020 |

OTHER PUBLICATIONS

Extended European Search Report issued Apr. 16, 2024 in corresponding European Patent Application No. 21861648.0, 8 pages.
International Search Report issued Sep. 21, 2021 in PCT/JP2021/031258 filed on Aug. 25, 2021, 3 pages.
Samuneva, B., et al. "Interaction Between Glasses and Alkali Metal Vapours" Journal of Non-Crystalline Solids, 1989, vol. 112, pp. 385-391.

\* cited by examiner

*Primary Examiner* — Elizabeth A. Bolden
(74) *Attorney, Agent, or Firm* — Oblon, McClelland, Maier & Neustadt, L.L.P.

(57) ABSTRACT

An alkali-free glass includes, as represented by mol % based on oxides: 50 to 80% of $SiO_2$; 2 to 6% of $Al_2O_3$; 18 to 35% of $B_2O_3$; 1 to 6% of MgO; 0 to 6% of CaO; 0 to 6% of SrO; and 0 to 3% of BaO. A formula (A) is [MgO]+[CaO]+[SrO]+[BaO], and a value of the formula (A) is 2% or more and 6% or less. A formula (B) is $[Al_2O_3]$—([MgO]+[CaO]+[SrO]+[BaO]), and a value of the formula (B) is −3% or more and 2% or less.

24 Claims, 1 Drawing Sheet

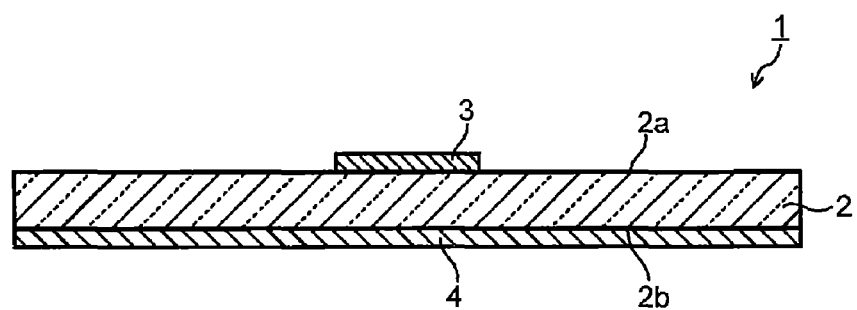

ALKALI-FREE GLASS AND GLASS PLATE

CROSS-REFERENCE TO RELATED APPLICATIONS

This is a bypass continuation of International Patent Application No. PCT/JP2021/031258, filed on Aug. 25, 2021, which claims priority to Japanese Patent Application No. 2020-143080, filed on Aug. 27, 2020, and Japanese Patent Application No. 2021-009791, filed on Jan. 25, 2021. The contents of these applications are hereby incorporated by reference in their entireties.

TECHNICAL FIELD

The present disclosure relates to an alkali-free glass. The present disclosure also relates to a glass plate, a glass substrate for a high-frequency device, a panel antenna, a window glass, a vehicle window glass, and a cover glass for a touch panel including the alkali-free glass.

BACKGROUND ART

There are electronic devices such as communication devices such as a mobile phone, a smartphone, a portable information terminal, and a Wi-Fi device, a surface acoustic wave (SAW) device, a radar component, and an antenna component. In such an electronic device, in order to increase a communication capacity, increase a communication speed, and the like, a high frequency of a signal frequency is advanced. An insulating substrate such as a resin substrate, a ceramic substrate, or a glass substrate is generally used as a circuit substrate used in an electronic device for high-frequency applications. An insulating substrate used in a high-frequency device is required to reduce transmission loss based on dielectric loss, conductor loss, and the like in order to ensure characteristics such as quality and strength of a high-frequency signal.

Among these insulating substrates, the resin substrate has low rigidity due to characteristics thereof. Therefore, when the rigidity (strength) is required for a semiconductor package product, it is difficult to apply the resin substrate. It is difficult to enhance smoothness of a surface of the ceramic substrate, and accordingly, there is a disadvantage that the conductor loss caused by a conductor formed on the substrate surface tends to increase. On the other hand, since the glass substrate has high rigidity, it is easy to reduce a size and a thickness of the package, it is excellent in surface smoothness, and it is easy to increase the size of the substrate itself.

Patent Literature 1 discloses a glass substrate for a high-frequency device having a dielectric loss tangent of 0.007 or less at 35 GHz.

CITATION LIST

Patent Literature

Patent Literature 1: WO 2018/051793

SUMMARY OF INVENTION

Technical Problem

In recent years, in addition to lowering the dielectric loss tangent in a high-frequency region, the glass substrate for the above use is required to have excellent acid resistance.

In a manufacturing process of a circuit substrate of a liquid crystal antenna, a high-frequency device, or the like, chemical cleaning is performed as a pretreatment of forming a wiring layer on the glass substrate. If chemical resistance of the glass is low, for example, a substrate surface may be dissolved during the acid cleaning, and smoothness of the substrate surface may be impaired, thereby reducing the adhesion of a film formed on the substrate surface. An eluate may adhere to the substrate surface. Accordingly, the conductor loss due to the conductor formed on the substrate surface may increase.

In addition, the glass substrate for the above application is required to have a low surface devitrification temperature in order to improve glass quality and productivity of the glass plate.

In addition, the glass substrate for the above application is required to have excellent phase separation stability. When the glass is excellent in the phase separation stability, for example, when the glass substrate is subjected to the acid cleaning, it is possible to suitably prevent local irregularities from being generated on the substrate surface. Accordingly, the transmission loss of the high-frequency signal can be reduced.

An object of the present disclosure is to provide an alkali-free glass having a low dielectric loss tangent in a high-frequency region, a low surface devitrification temperature, and excellent acid resistance and phase separation stability.

Solution to Problem

As a result of intensive studies aimed at solving the above problems, the inventors of the present invention have found that the above problems can be solved by the following configuration.

[1] An alkali-free glass containing:
as represented by mol % based on oxides,
50 to 80% of $SiO_2$;
2 to 6% of $Al_2O_3$;
18 to 35% of $B_2O_3$;
1 to 6% of MgO;
0 to 6% of CaO;
0 to 6% of SrO; and
0 to 3% of BaO,
a formula (A) is [MgO]+[CaO]+[SrO]+[BaO], and a value of the formula (A) is 2% or more and 6% or less, and
a formula (B) is $[Al_2O_3]$—([MgO]+[CaO]+[SrO]+[BaO]), and a value of the formula (B) is −3% or more and 2% or less.

[2] The alkali-free glass according to [1], in which a formula (C) is $[SiO_2]+[B_2O_3]$, and a value of the formula (C) is 88% or more and 100% or less.

[3] The alkali-free glass according to [1] or [2], in which a formula (C) is $[SiO_2]+[B_2O_3]$, and a value of the formula (C) is 89.4% or more and 93% or less.

[4] The alkali-free glass according to any one of [1] to [3], in which a formula (D) is $[Al_2O_3]/[B_2O_3]$, and a value of the formula (D) is 0.1 or more and 0.3 or less.

[5] The alkali-free glass according to any one of [1] to [4], in which a formula (E) is [MgO]/([MgO]+[CaO]+[SrO]+[BaO]), and a value of the formula (E) is 0.5 or more.

[6] The alkali-free glass according to any one of [1] to [5], in which a formula (F) is ([MgO]+[CaO]+[SrO]+[BaO])/$[Al_2O_3]$, and a value of the formula (F) is 0.5 or more and 1.2 or less.

[7] The alkali-free glass according to any one of [1] to [6], containing 0 to 0.5 mol % of Fe in terms of $Fe_2O_3$.
[8] The alkali-free glass according to any one of [1] to [7], having a β-OH value of 0.05 $mm^{-1}$ or more and 1.0 $mm^{-1}$ or less.
[9] The alkali-free glass according to any one of [1] to [8], containing at least one selected from the group consisting of $Li_2O$, $Na_2O$, and $K_2O$ in an amount of 0 to 0.4% in total as represented by mol % based on oxides.
[10] The alkali-free glass according to [9], in which a formula (G) is $[Li_2O]/([Li_2O]+[N_2O]+[K_2O])$, and a value of the formula (G) is 0.5 or more.
[11] The alkali-free glass according to any one of [1] to [10], containing 0 to 0.5% of $SnO_2$ as represented by mol % based on oxides.
[12] The alkali-free glass according to any one of [1] to [11], containing at least one selected from the group consisting of $Sc_2O_3$, $TiO_2$, ZnO, $Ga_2O_3$, $GeO_2$, $Y_2O_3$, $ZrO_2$, $Nb_2O_5$, $In_2O_3$, $TeO_2$, $HfO_2$, $Ta_2O_5$, $WO_3$, $Bi_2O_3$, $La_2O_3$, $Gd_2O_3$, $Yb_2O_3$, and $Lu_2O_3$ in an amount of 0 to 1% in total as represented by mol % based on oxides.
[13] The alkali-free glass according to any one of [1] to [12], containing 0 to 1.5 mol % of F.
[14] The alkali-free glass according to any one of [1] to [13], having a dielectric loss tangent at 35 GHz of 0.005 or less.
[15] The alkali-free glass according to any one of [1] to [14], having a density of 2.58 $g/cm^3$ or less, and having an average coefficient of thermal expansion at 50° C. to 350° C. of $20\times10^{-7}$/° C. to $50\times10^{-7}$/° C.
[16] The alkali-free glass according to any one of [1] to [15], having a temperature $T_2$ at which a glass viscosity is $10^2$ dPa·s of 1500 to 1900° C., and having a temperature $T_4$ at which the glass viscosity is $10^4$ dPa·s of 1290° C. or lower.
[17] The alkali-free glass according to any one of [1] to [16], having a glass transition temperature of 700° C. or lower.
[18] The alkali-free glass according to any one of [1] to [17], having a surface devitrification temperature of 1400° C. or lower.
[19] A glass plate including the alkali-free glass according to any one of [1] to [18], and including main surfaces and an end surface, in which at least one main surface has an arithmetic mean roughness Ra of 1.5 nm or less.
[20] A glass plate including the alkali-free glass according to any one of [1] to [18], and including main surfaces and an end surface, in which at least one side is 1000 mm or more and a thickness is 0.7 mm or less.
[21] The glass plate according to [19] or [20], in which the glass plate is manufactured by a float process or a fusion process.
[22] A glass substrate for a high-frequency device including the alkali-free glass according to any one of [1] to [18].
[23] A panel antenna including the alkali-free glass according to any one of [1] to [18].
[24] A window glass including the alkali-free glass according to any one of [1] to [18].
[25] A vehicle window glass including the alkali-free glass according to any one of [1] to [18].
[26] A cover glass for a touch panel including the alkali-free glass according to any one of [1] to [18].
[27] An alkali-free glass containing,
 as represented by mol % based on oxides:
 50 to 78% of $SiO_2$;
 2 to 6% of $Al_2O_3$;
 18 to 35% of $B_2O_3$;
 1 to 6% of MgO;
 0 to 6% of CaO;
 0 to 6% of SrO; and
 0 to 3% of BaO,
 a formula (A) is [MgO]+[CaO]+[SrO]+[BaO], and a value of the formula (A) is 2% or more and 6% or less, and
 a formula (B) is $[Al_2O_3]$—([MgO]+[CaO]+[SrO]+[BaO]), and a value of the formula (B) is −3% or more and 2% or less.
[28] The alkali-free glass according to [27], in which a formula (C) is $[SiO_2]+[B_2O_3]$, and a value of the formula (C) is 88% or more and 96% or less.

Advantageous Effects of Invention

An alkali-free glass of the present disclosure has a low dielectric loss tangent in a high-frequency region. Therefore, a dielectric loss of a high-frequency signal can be reduced, and the alkali-free glass is suitable for a glass substrate for a high-frequency device. According to a circuit substrate using such a glass substrate, it is possible to reduce transmission loss of the high-frequency signal and provide a high-frequency device such as a practical electronic device.

The alkali-free glass according to the present disclosure is excellent in acid resistance. Therefore, when a glass substrate is subjected to acid cleaning in a manufacturing process of a circuit substrate of a liquid crystal antenna, a high-frequency device, or the like, there is no chance that the substrate surface is dissolved and the smoothness of the substrate surface deteriorates, or an eluate adheres to the substrate surface. Therefore, a decrease in adhesion of a film formed on the substrate surface can be prevented. In addition, an increase in conductor loss can be prevented.

The alkali-free glass according to the present disclosure can reduce transmission loss of radio waves in a high-frequency band. Therefore, it is also suitable for a glass product that transmits and receives the radio waves in the high-frequency band.

The alkali-free glass according to the present disclosure has a low surface devitrification temperature. Therefore, glass quality and productivity of a glass plate are excellent.

The alkali-free glass according to the present disclosure is excellent in phase separation stability. Therefore, for example, when the glass substrate is subjected to the acid cleaning, it is possible to suitably prevent local irregularities from being generated on the substrate surface. Accordingly, the transmission loss of the high-frequency signal can be reduced.

BRIEF DESCRIPTION OF DRAWINGS

FIG. 1 is a schematic cross-sectional view showing an example of a configuration of a circuit substrate for a high-frequency device.

DESCRIPTION OF EMBODIMENTS

Hereinafter, an embodiment of the present disclosure will be described. In the following description, a numerical value range indicated by using "to" indicates a range including numerical values described before and after "to" as a minimum value and a maximum value, respectively. Unless otherwise specified, a content of each component in an alkali-free glass or a glass plate indicates a molar percentage (mol %) based on oxides. [Metal oxide] in formulas (A) to (J) represents mol % of the metal oxide component. For example, [MgO] represents mol % of magnesium oxide.

The term "high frequency" used herein refers to 10 GHz or more, preferably more than 30 GHz, and more preferably 35 GHz or more. Further, the "high frequency" refers to 3 THz or less, preferably 1 THz or less, more preferably 300 GHz or less, and even more preferably 100 GHz or less.

Hereinafter, the alkali-free glass according to the present disclosure (hereinafter, may be simply referred to as a "glass") will be described.

If a content of $SiO_2$ as a network forming material is 50 mol % (hereinafter, simply referred to as %) or more, a dielectric loss tangent in a high-frequency region can be reduced, glass formability and acid resistance can be improved, and an increase in a surface devitrification temperature can be prevented. The content of $SiO_2$ is preferably 55% or more, more preferably 58% or more, even more preferably 60% or more, still more preferably 60.5% or more, and still even more preferably 61% or more. If the content of $SiO_2$ is 80% or less, solubility of glass can be improved. The content of $SiO_2$ is preferably 78% or less, preferably 75% or less, more preferably 73% or less, even more preferably 71% or less, still more preferably 69% or less, still even more preferably 67% or less, yet still even more preferably 65% or less, even more preferably 64% or less, still even more preferably 63% or less, yet still even more preferably 62.5% or less, and particularly even more preferably 62% or less.

$Al_2O_3$ is a component that is effective in improving the acid resistance, improving a Young's modulus, improving phase separation stability of glass, reducing a coefficient of thermal expansion, and the like. If a content of $Al_2O_3$ is 2% or more, the acid resistance and the phase separation stability of glass are improved. The content of $Al_2O_3$ is preferably 2.5% or more, more preferably 3% or more, even more preferably 3.5% or more, still more preferably 3.7% or more, and still even more preferably 4% or more. If the content of $Al_2O_3$ is 6% or less, the dielectric loss tangent in the high-frequency region can be reduced. The content of $Al_2O_3$ is preferably 5.5% or less, more preferably 5% or less, and even more preferably 4.5% or less.

If a content of $B_2O_3$ is 18% or more, the meltability of the glass is improved. In addition, the dielectric loss tangent in the high-frequency region can be reduced. The content of $B_2O_3$ is preferably 19% or more, more preferably 20% or more, even more preferably 21% or more, still more preferably 22% or more, still even more preferably 23% or more, yet still even more preferably 24% or more, even more preferably 25% or more, even more preferably 26% or more, still even more preferably 27% or more, yet still even more preferably 28% or more, yet still even more preferably 28.5% or more, yet still even more preferably 29% or more, particularly preferably 29.5% or more, and most preferably 30% or more. If the content of $B_2O_3$ is 35% or less, the acid resistance can be improved. The content of $B_2O_3$ is preferably 34% or less, more preferably 33% or less, even more preferably 32% or less, still more preferably 31.5% or less, still even more preferably 31% or less, and yet still even more preferably 30.5% or less.

MgO is a component that increases the Young's modulus without increasing a specific gravity. That is, MgO is a component that increases a specific elastic modulus, which can reduce a deflection problem, improve a fracture toughness value, and increase glass strength. In addition, MgO is also a component that improves the meltability of the glass. If a content of MgO is 1% or more, an effect of containing MgO is obtained, and the coefficient of thermal expansion does not become too low. In addition, the acid resistance of glass is improved. The content of MgO is preferably 2% or more, more preferably 2.5% or more, and even more preferably 3% or more. If the content of MgO is 6% or less, an increase in the surface devitrification temperature can be prevented. The content of MgO is preferably 5.4% or less, more preferably 5% or less, and even more preferably 4% or less.

CaO is a component that has a characteristic of increasing the specific elastic modulus next to MgO among alkali earth metals and not excessively lowering a strain point, and improves the meltability of the glass similarly to MgO. Further, CaO is also a component having a characteristic that the surface devitrification temperature is less likely to be increased as compared with MgO. Therefore, the glass may contain CaO. If a content of CaO is 6% or less, the average coefficient of thermal expansion does not become too high, and an increase in the surface devitrification temperature can be prevented. The content of CaO is preferably 5% or less, more preferably 4% or less, even more preferably 3% or less, still more preferably 2% or less, still even more preferably 1% or less, yet still even more preferably 0.8% or less, even more preferably 0.6% or less, and still even more preferably 0.4% or less. When CaO is contained, the content thereof is preferably 0.1% or more, and more preferably 0.2% or more.

SrO is a component that does not increase the surface devitrification temperature of the glass and improves the meltability of the glass. Therefore, the glass may contain SrO. A content of SrO is preferably 0.1% or more, more preferably 0.3% or more, and even more preferably 0.5% or more. If the content of SrO is 6% or less, the average coefficient of thermal expansion can be prevented from being too high without excessively increasing the specific gravity. The content of SrO is preferably 5% or less, more preferably 4% or less, even more preferably 3% or less, still more preferably 2% or less, and still even more preferably 1% or less.

BaO is a component that does not increase the surface devitrification temperature of the glass and improves the meltability of the glass. Therefore, the glass may contain BaO. A content of BaO is preferably 0.1% or more, more preferably 0.2% or more. When the content of BaO is large, the specific gravity tends to increase, the Young's modulus tends to decrease, and the average coefficient of thermal expansion tends to increase too much. In addition, the acid resistance of glass decreases. Therefore, the content of BaO is preferably 3% or less, more preferably 2% or less, even more preferably 1% or less, still more preferably 0.8% or less, still even more preferably 0.6% or less, and yet still even more preferably 0.4% or less.

In the alkali-free glass according to the present disclosure, when a formula (A) is a total content represented by [MgO]+[CaO]+[SrO]+[BaO], a value of the formula (A) is 2% or more and 6% or less. If the value of the formula (A) is 2% or more, an increase in the surface devitrification temperature can be prevented. Accordingly, the glass quality is improved, and the productivity in manufacturing the glass plate is improved.

The value of the formula (A) is preferably 2.5% or more, more preferably 3% or more, even more preferably 3.5% or more, and still more preferably 4% or more.

If the value of the formula (A) is 6% or less, the dielectric loss tangent in the high-frequency region can be lowered, and the acid resistance and the phase separation stability of the glass are improved.

The value of the formula (A) is preferably 5.5% or less, more preferably 5% or less, and even more preferably 4.5% or less.

In the glass according to the present disclosure, when a formula (B) is an amount represented by $[Al_2O_3]-([MgO]+[CaO]+[SrO]+[BaO])$, a value of the formula (B) is −3% or more and 2% or less.

If the value of the formula (B) is −3% or more, the acid resistance and the phase separation stability of the glass are improved.

The value of the formula (B) is preferably −2.5% or more, more preferably −2% or more, even more preferably −1.5% or more, still more preferably −1% or more, and still even more preferably −0.5% or more.

If the value of the formula (B) is 2% or less, an increase in the surface devitrification temperature can be prevented. Accordingly, the glass quality is improved, and the productivity in manufacturing the glass plate is improved.

The value of the formula (B) is preferably 1.5% or less, more preferably 1% or less, even more preferably 0.5% or less, and still more preferably 0.2% or less.

On the other hand, when it is desired to further reduce the dielectric loss tangent in the high-frequency region of the glass according to the present disclosure, specifically, when the dielectric loss tangent (tan δ) at 35 GHz of the glass according to the present disclosure is desired to be 0.002 or less, the value of the formula (B) is preferably 0% or less, more preferably −0.1% or less, even more preferably −0.2% or less, still more preferably −0.3% or less, still even more preferably −0.4% or less, yet still even more preferably −0.5% or less, even more preferably −0.6% or less, still even more preferably −0.8% or less, and yet still even more preferably −1% or less.

In the glass according to the present disclosure, when a formula (C) is a total content represented by $[SiO_2]+[B_2O_3]$, a value of the formula (C) is preferably 88% or more and 100% or less, preferably 96% or less, and more preferably 89.4% or more and 93% or less. If the value of the formula (C) is 88% or more, relative permittivity and the dielectric loss tangent in the high-frequency region are low.

The value of the formula (C) is more preferably 89.5% or more, even more preferably 90% or more, still more preferably 90.5% or more, still even more preferably 91% or more, and yet still even more preferably 91.5% or more.

If the value of the formula (C) is 93% or less, a temperature $T_2$ at which the glass viscosity is $10^2$ dPa·s (hereinafter, referred to as a temperature $T_2$) is low.

The value of the formula (C) is preferably 92.5% or less, and more preferably 92% or less.

In the glass according to the present disclosure, when a formula (D) is a content ratio represented by $[Al_2O_3]/[B_2O_3]$, a value of the formula (D) is preferably 0.1 or more and 0.3 or less. If the value of the formula (D) is in the above range, the acid resistance of the glass is improved.

The value of the formula (D) is preferably 0.12 or more, and more preferably 0.13 or more.

The value of the formula (D) is preferably 0.28 or less, more preferably 0.26 or less, even more preferably 0.25 or less, still more preferably 0.23 or less, and still even more preferably 0.2 or less.

In the glass according to the present disclosure, when a formula (E) is a content ratio represented by $[MgO]/([MgO]+[CaO]+[SrO]+[BaO])$, a value of the formula (E) is preferably 0.5 or more. If the value of the formula (E) is in the above range, the phase separation stability and the acid resistance of the glass are improved.

The value of the formula (E) is preferably 0.55 or more, more preferably 0.6 or more, even more preferably 0.65 or more, still more preferably 0.7 or more, still even more preferably 0.75 or more, and yet still even more preferably 0.85 or more.

An upper limit of the value of the formula (E) is not particularly limited, and is preferably 0.95 or less because an increase in the surface devitrification temperature can be prevented, and more preferably 0.9 or less.

In the glass according to the present disclosure, when a formula (F) is a content ratio represented by $([MgO]+[CaO]+[SrO]+[BaO])/[Al_2O_3]$, a value of the formula (F) is preferably 0.5 or more and 1.2 or less. If the value of the formula (F) is 0.5% or more, an increase in the surface devitrification temperature can be prevented. Accordingly, the glass quality is improved, and the productivity in manufacturing the glass plate is improved.

The value of the formula (F) is preferably 0.55 or more, more preferably 0.6 or more, even more preferably 0.65 or more, still more preferably 0.7 or more, still even more preferably 0.75 or more, yet still even more preferably 0.8 or more, even more preferably 0.85 or more, still even more preferably 0.9 or more, yet still even more preferably 0.95 or more, yet still even more preferably 1 or more, and yet still even more preferably 1.05 or more.

If the value of the formula (F) is 1.2 or less, the acid resistance and the phase separation stability of the glass are improved.

The value of the formula (F) is more preferably 1.1 or less.

In the glass according to the present disclosure, when a formula (H) is a content ratio represented by $[BaO]/[MgO]$, a value of the formula (H) is preferably 0.01 or more and 3 or less.

If the value of the formula (H) is 0.01 or more, the phase separation stability of the glass are improved. The value of the formula (H) is more preferably 0.02 or more, even more preferably 0.03 or more, still more preferably 0.04 or more, still even more preferably 0.05 or more, and yet still even more preferably 0.06 or more.

If the value of the formula (H) is 3 or less, deterioration in the acid resistance of the glass can be prevented. The value of the formula (H) is more preferably 2.5 or less, even more preferably 2 or less, still more preferably 1 or less, still even more preferably 0.5 or less, yet still even more preferably 0.3 or less, even more preferably 0.2 or less, still even more preferably 0.15 or less, and yet still even more preferably 0.1 or less.

In the glass according to the present disclosure, when a formula (I) is an amount represented by $[SiO_2]-[B_2O_3]$, a value of the formula (I) is preferably 20% or more and 40% or less.

If the value of the formula (I) is 20% or more, the acid resistance of the glass is improved. The value of the formula (I) is more preferably 22% or more, even more preferably 24% or more, still more preferably 25% or more, still even more preferably 26% or more, yet still even more preferably 27% or more, even more preferably 28% or more, still even more preferably 29% or more, and yet still even more preferably 30% or more.

If the value of the formula (I) is 40% or less, the dielectric loss tangent in the high-frequency region can be reduced. Dependence of the dielectric loss tangent on cooling can be reduced to prevent the deterioration in the dielectric loss tangent due to rapid cooling, resulting in excellent productivity.

The value of the formula (I) is more preferably 38% or less, even more preferably 36% or less, still more preferably 35% or less, still even more preferably 34% or less, yet still even more preferably 33% or less, and even more preferably 32% or less.

In the glass according to the present disclosure, when a formula (J) is a content ratio represented by ([SrO]+[BaO])/([MgO]+[CaO]), a value of the formula (J) is preferably 0.05 or more and 2 or less.

If the value of the formula (J) is 0.05 or more, the dielectric loss tangent in the high-frequency region can be reduced while maintaining the phase separation stability of the glass. The value of the formula (J) is more preferably 0.1 or more, even more preferably 0.15 or more, still more preferably 0.2 or more, still even more preferably 0.25 or more, and yet still even more preferably 0.3 or more.

If the value of the formula (J) is 2 or less, the deterioration in the acid resistance of the glass can be prevented. The value of the formula (J) is more preferably 1.5 or less, even more preferably 1 or less, still more preferably 0.8 or less, still even more preferably 0.6 or less, yet still even more preferably 0.5 or less, even more preferably 0.45 or less, still even more preferably 0.4 or less, and yet still even more preferably 0.35 or less.

The glass according to the present disclosure may contain Fe in order to improve the meltability of the glass. However, from the viewpoint of coloring of the glass, reduction in transmittance in a visible region, and reduction in relative permittivity and dielectric loss tangent in the high-frequency region, a content of Fe is preferably 0.5 mol % or less, more preferably 0.2 mol % or less, and even more preferably 0.1 mol % or less in terms of $Fe_2O_3$.

The content of Fe is preferably 0.15% or less, more preferably 0.1% or less, even more preferably 0.05% or less, and still more preferably 0.03% or less as represented by mass percentage based on oxides in terms of $Fe_2O_3$.

In the glass according to the present disclosure, a β-OH value ($mm^{-1}$) is preferably 0.05 $mm^{-1}$ or more and 1.0 $mm^{-1}$ or less.

The β-OH value is an index of a moisture content in the glass, and is obtained by measuring an absorbance of a glass sample with respect to light having a wavelength of 2.75 to 2.95 μm, and dividing a maximum value $β_{max}$ of the absorbance by a thickness (mm) of the sample. If the β-OH value is 0.05 $mm^{-1}$ or more, a resistance value at the temperature $T_2$ at which the glass viscosity is $10^2$ dPa·s is low, which is suitable for melting the glass by electrical heating and has few bubble defects in the glass. Specifically, when the β-OH value is 0.05 $mm^{-1}$ or more, the meltability of the glass is improved. When the β-OH value is 1.0 $mm^{-1}$ or less, the bubble defects in the glass can be prevented. The β-OH value is more preferably 0.8 $mm^{-1}$ or less, even more preferably 0.7 $mm^{-1}$ or less, and still more preferably 0.6 $mm^{-1}$ or less. The β-OH value is more preferably 0.1 $mm^{-1}$ or more, even more preferably 0.2 $mm^{-1}$ or more, still more preferably 0.25 $mm^{-1}$ or more, still even more preferably 0.3 $mm^{-1}$ or more, and particularly preferably 0.35 $mm^{-1}$ or more.

The glass according to the present disclosure preferably contains substantially no alkali metal oxide such as $Li_2O$, $Na_2O$, or $K_2O$. In the present disclosure, "substantially no alkali metal oxide" means that the alkali metal oxide is not contained except for inevitable impurities mixed from raw materials and the like, that is, the alkali metal oxide is not intentionally contained. However, the alkali metal oxide may be contained in a predetermined amount for the purpose of obtaining specific effects, that is, effects such as lowering a strain point, lowering a glass transition temperature (Tg), lowering an annealing point, lowering the temperature $T_2$, and lowering a temperature $T_4$ at which the glass viscosity is $10^4$ dPa·s (hereinafter, referred to as the temperature $T_4$).

A total content of the alkali metal oxide is preferably 1% or less, more preferably 0.7% or less, even more preferably 0.6% or less, still more preferably 0.5% or less, still even more preferably 0.45% or less, yet still even more preferably 0.4% or less, and even more preferably 0.35% or less.

In addition, among the alkali metal oxides, at least one selected from the group consisting of $Li_2O$, $Na_2O$, and $K_2O$ may be contained in a total content represented by $[Li_2O]+[Na_2O]+[K_2O]$ of 0.4% or less. If the total content represented by $[Li_2O]+[Na_2O]+[K_2O]$ is 0.4% or less, the dielectric loss tangent in the high-frequency region is low, and it is suitable for use as a substrate for a thin film transistor (TFT).

$[Li_2O]+[Na_2O]+[K_2O]$ is more preferably 0.35% or less, even more preferably 0.3% or less, still more preferably 0.25% or less, still even more preferably 0.2% or less, yet still even more preferably 0.15% or less, even more preferably 0.10% or less, and still even more preferably 0.05% or less.

The total content of $Li_2O$, $Na_2O$, and $K_2O$ is preferably 0.4% or less, more preferably 0.35% or less, even more preferably 0.3% or less, still more preferably 0.25% or less, still even more preferably 0.2% or less, yet still even more preferably 0.15% or less, even more preferably 0.10% or less, and still even more preferably 0.05% or less as represented by mass percentage based on oxides.

In the glass according to the present disclosure, when the content ratio represented by a formula (G) is $[Li_2O]/([Li_2O]+[Na_2O]+[K_2O])$, a value of the formula (G) is preferably 0.5 or more. If the value of the formula (G) is in the above range, productivity of the glass can be improved by lowering the strain point, Tg, the annealing point, the temperature $T_2$, and the temperature $T_4$, or lowering the resistance value of the glass, while lowering the relative permittivity and the dielectric loss tangent in the high-frequency region.

The value of the formula (G) is more preferably 0.55 or more, even more preferably 0.6 or more, still more preferably 0.65 or more, and still even more preferably 0.7 or more. The value of the formula (G) is preferably 0.95 or less.

In order to improve refining property of the glass, the glass according to the present disclosure may contain at least one selected from the group consisting of $SnO_2$, Cl, and $SO_3$ in a total content of 0.5% or less. The total content of these elements is preferably 0.4% or less, more preferably 0.3% or less, even more preferably 0.2% or less, and still more preferably 0.1% or less.

The total content of $SnO_2$, Cl, and $SO_3$ is preferably 0.5% or less, more preferably 0.3% or less, and even more preferably 0.1% or less as represented by mass percentage based on oxides.

The content of $SnO_2$ is preferably 0.5% or less, more preferably 0.4% or less, and even more preferably 0.3% or less.

The content of $SnO_2$ is preferably 0.3% or less, more preferably 0.2% or less, and even more preferably 0.1% or less as represented by mass percentage based on oxides.

In order to improve the acid resistance of the glass, the glass according to the present disclosure may contain, as a trace component, at least one selected from the group consisting of $Sc_2O_3$, $TiO_2$, ZnO, $Ga_2O_3$, $GeO_2$, $Y_2O_3$, $ZrO_2$, $Nb_2O_5$, $In_2O_3$, $TeO_2$, $HfO_2$, $Ta_2O_5$, $WO_3$, $Bi_2O_3$, $La_2O_3$, $Gd_2O_3$, $Yb_2O_3$, and $Lu_2O_3$. However, when the content of the trace component is too large, the phase separation stability of the glass tends to deteriorate, and the total content of the trace component is preferably 1% or less, more preferably 0.25% or less, even more preferably 0.2% or less, still more preferably 0.1% or less, and still even more preferably 0.05% or less.

The glass according to the present disclosure may contain only one or two or more kinds of the above-described trace components.

In order to improve the meltability and the like of the glass, the glass according to the present disclosure may contain $P_2O_5$. The content of $P_2O_5$ is preferably 2% or less, more preferably 1% or less, even more preferably 0.5% or less, still more preferably 0.3% or less, and still even more preferably 0.1% or less. On the other hand, since $P_2O_5$ may diffuse in glass forming equipment, re-aggregate, and fall on the glass plate to cause defects of foreign substances, the content of $P_2O_5$ is yet still even more preferably 0.05% or less, even more preferably 0.01% or less, still even more preferably 0.005% or less, and most preferably substantially no $P_2O_5$ is contained. In the present disclosure, "substantially no $P_2O_5$" means that $P_2O_5$ is not contained except for inevitable impurities mixed from raw materials and the like, that is, $P_2O_5$ is not intentionally contained.

The glass according to the present disclosure may contain F for the purpose of improving the meltability of the glass, lowering the strain point of the glass, lowering the Tg, lowering the annealing point, lowering the dielectric loss tangent, and the like. A content of F is preferably 0.1 mol % or more, more preferably 0.2 mol % or more, and even more preferably 0.4 mol % or more. However, from the viewpoint of preventing glass quality deterioration due to diffusion of F, the content of F is preferably 1.5 mol % or less, more preferably 1 mol % or less, even more preferably 0.5 mol % or less, and still more preferably 0.1 mol % or less. The content of F is preferably 0.01% or more, and more preferably 0.03% or more as represented by mass percentage. An upper limit is preferably 0.2% or less, more preferably 0.1% or less, and even more preferably 0.05% or less.

The glass according to the present disclosure may contain at least one selected from the group consisting of $Se_2O_3$, $TeO_2$, $Ga_2O_3$, $In_2O_3$, $GeO_2$, $CdO$, $BeO$, and $Bi_2O_3$ in order to improve the meltability, refining property, formability, and the like of the glass, to obtain absorption at a specific wavelength, and to improve the density, hardness, bending rigidity, durability, and the like. A total content of these elements is preferably 2% or less, more preferably 1% or less, even more preferably 0.5% or less, still more preferably 0.3% or less, still even more preferably 0.1% or less, yet still even more preferably 0.05% or less, and even more preferably 0.01% or less.

The glass according to the present disclosure may contain a rare earth oxide or a transition metal oxide in order to improve the meltability, the refining property, the formability, and the like of the glass and to improve the hardness of the glass such as the Young's modulus.

The glass according to the present disclosure may contain, as the rare earth oxide, at least one selected from the group consisting of $Sc_2O_3$, $Y_2O_3$, $La_2O_3$, $Ce_2O_3$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$. A total content of these elements is preferably 2% or less, more preferably 1% or less, even more preferably 0.5% or less, still more preferably 0.3% or less, still even more preferably 0.1% or less, yet still even more preferably 0.05% or less, and even more preferably 0.01% or less.

The glass according to the present disclosure may contain, as the transition metal oxide, at least one selected from the group consisting of $V_2O_5$, $Ta_2O_3$, $Nb_2O_5$, $WO_3$, $MoO_3$, and $HfO_2$. A total content of these elements is preferably 2% or less, more preferably 1% or less, even more preferably 0.5% or less, still more preferably 0.3% or less, even more preferably 0.1% or less, even more preferably 0.05% or less, and still even more preferably 0.01% or less.

In order to improve the meltability and the like of the glass, the glass according to the present disclosure may contain $ThO_2$, which is an actinoid oxide. The content of $ThO_2$ is preferably 2% or less, more preferably 1% or less, even more preferably 0.5% or less, still more preferably 0.3% or less, still even more preferably 0.1% or less, yet still even more preferably 0.05% or less, even more preferably 0.01% or less, and still even more preferably 0.005% or less.

The dielectric loss tangent (tan δ) at 35 GHz of the glass according to the present disclosure is preferably 0.005 or less. If the dielectric loss tangent at 35 GHz is 0.005 or less, the dielectric loss can be reduced in a high-frequency region exceeding 30 GHz. The dielectric loss tangent at 35 GHz is more preferably 0.004 or less, even more preferably 0.003 or less, still more preferably 0.002 or less, and still even more preferably 0.0015 or less. A lower limit is not particularly limited, and is preferably, for example, 0.0005 or more.

The dielectric loss tangent at 10 GHz is preferably 0.003 or less, more preferably 0.0025 or less, even more preferably 0.002 or less, and still more preferably 0.0015 or less. A lower limit is not particularly limited, and is preferably, for example, 0.0005 or more.

The relative permittivity at 35 GHz of the glass according to the present disclosure is preferably 5 or less. If the relative permittivity at 35 GHz is 5 or less, the dielectric loss can be reduced in the high-frequency region. The relative permittivity at 35 GHz is more preferably 4.8 or less, even more preferably 4.6 or less, still more preferably 4.5 or less, and still even more preferably 4.3 or less. The lower limit is not particularly limited, and is preferably, for example, 3 or more.

The relative permittivity at 10 GHz is preferably 5 or less, more preferably 4.8 or less, even more preferably 4.6 or less, still more preferably 4.4 or less, and still even more preferably 4.3 or less. The lower limit is not particularly limited, and is preferably, for example, 3 or more.

The glass according to the present disclosure preferably satisfies −0.0003≤(tan δ100−tan δ10)≤0.0003, where the dielectric loss tangent at 10 GHz is tan δ10 when Tg is the glass transition temperature and the glass is heated to (Tg+50) ° C. and then cooled to (Tg−150) ° C. at 10° C./min, and the dielectric loss tangent at 10 GHz is tan δ100 when the glass is heated to (Tg+50) ° C. and then cooled to (Tg−150) ° C. at 100° C./min in the same way. When the above relationship is satisfied, deterioration of the dielectric loss tangent tan δ can be prevented even in the case of rapid cooling in glass production.

In a glass composition in which tan δ100−tan δ10 satisfies the above range, the value of the formula (C), which is the total content represented by $[SiO_2]+[B_2O_3]$, is preferably 88% or more and 96% or less. When the value of the formula (C) is 88% or more, deterioration of the dielectric loss tangent tan δ can be prevented even when a cooling rate is increased in the glass production. The value of the formula (C) is more preferably 89% or more, even more preferably 89.5% or more, still more preferably 90% or more, still even more preferably 90.5% or more, yet still even more preferably 91% or more, and even more preferably 91.5% or more. When the value of the formula (C) is more than 96%, an influence of the dielectric loss tangent tan δ on the cooling rate may be small. However, since a glass melting temperature is high, the glass may be produced by a method such as a vapor phase synthesis method, and the productivity of the glass may deteriorate. Since there is no room for containing oxides such as alkali earth metals and $Al_2O_3$ that improve the phase separation stability and the acid resistance, the value of the formula (C) is more preferably 95% or less, even more preferably 94.5% or less, still more preferably 94% or less, still even more preferably 93.5% or less, yet still even more preferably 93% or less, and even more 92.5% or less.

In the glass composition in which tan δ100-tan δ10 satisfies the above range, the content of $B_2O_3$ is preferably 18% or more and 35% or less. When the content of $B_2O_3$ is 18% or more, the influence of the dielectric loss tangent tan δ on the cooling rate is reduced, and a glass having a lower dielectric loss tangent tan δ can be obtained. The content of $B_2O_3$ is more preferably 19% or more, even more preferably 20% or more, still more preferably 21% or more, still even more preferably 22% or more, yet still even more preferably 23% or more, even more preferably 24% or more, still even more preferably 25% or more, yet still even more preferably 26% or more, yet still even more preferably 27% or more, yet still even more preferably 28% or more, yet still even more preferably 28.5% or more, particularly preferably 29% or more, and most preferably 29.5% or more. In addition, when the content of $B_2O_3$ is more than 35%, phase separation easily occurs, and it is difficult to obtain a uniform transparent glass. In addition, the acid resistance and the alkali resistance may deteriorate. The content of $B_2O_3$ is more preferably 34% or less, even more preferably 33% or less, still more preferably 32% or less, still even more preferably 31.5% or less, yet still even more preferably 31% or less, and particularly preferably 30.5% or less.

The glass according to the present disclosure preferably satisfies—0.0003≤(tan δ100-tan δA)≤0.0003, where the dielectric loss tangent at 10 GHz is tan δA, and the dielectric loss tangent at 10 GHz is tan δ100 when the glass transition temperature is Tg° C. and the glass is heated to (Tg+50) ° C. and then cooled to (Tg-150) ° C. at 100° C./min.

In order for tan δ100-tan δA to satisfy the above range, it is necessary to set the glass composition such that tan δ100-tan δ10 satisfy the above range, and to adjust the cooling rate and time for cooling the glass from (Tg+50) ° C. to (Tg-150) ° C. During this time, any temperature history can be taken, and an equivalent cooling rate A based on tan δ of the glass, which is to be described later, is preferably 0.01° C./min or more and 1000° C./min or less. When the equivalent cooling rate A based on tan δ is lower than 0.01° C./min, the glass production takes an enormous amount of time, and the productivity deteriorates. The equivalent cooling rate A based on tan δ is more preferably 0.1° C./min or more, even more preferably 1° C./min or more, still more preferably 2° C./min or more, still even more preferably 5° C./min or more, yet still even more preferably 10° C./min or more, even more preferably 20° C./min or more, still even more preferably 30° C./min or more, yet still even more preferably 40° C./min or more, yet still even more preferably 50° C./min or more, yet still even more preferably 60° C./min or more, yet still even more preferably 70° C./min or more, particularly preferably 80° C./min or more, and most preferably 90° C./min or more. In addition, when the equivalent cooling rate A based on tan δ is more than 1000° C./min, tan δ100-tan δA is too small, that is, the dielectric loss tangent tan δ A deteriorates, which is not preferable. The equivalent cooling rate A based on tan δ is more preferably 900° C./min or less, even more preferably 800° C./min or less, still more preferably 700° C./min or less, still even more preferably 600° C./min or less, yet still even more preferably 500° C./min or less, even more preferably 400° C./min or less, still even more preferably 350° C./min or less, yet still even more preferably 300° C./min or less, yet still even more preferably 250° C./min or less, and particularly preferably 200° C./min or less.

The equivalent cooling rate A based on tan δ: A glass plate is heated to (Tg+50) ° C. and then cooled to (Tg-150) ° C. at a constant cooling rate of X° C./min to produce a plurality of glasses, and the dielectric loss tangent tan δ at 10 GHz is measured. A linear regression is performed so that Log(tan δ)=a×Log(X)+b (a and b are constants). As an example of the cooling rate of X° C./min, three levels of 1° C./min, 40° C./min, and 200° C./min may be used. The equivalent cooling rate A of the glass produced in any cooling history is inversely calculated based on tan δ using the above regression equation.

A density of the glass according to the present disclosure is preferably 2.58 g/cm$^3$ or less. Accordingly, a self-weight deflection is reduced, and handling of a large-sized substrate is facilitated. In addition, a weight of the device using the glass can be reduced. The density is more preferably 2.57 g/cm$^3$ or less, and even more preferably 2.56 g/cm$^3$ or less. The lower limit is not particularly limited, and is preferably, for example, 2 g/cm$^3$ or more.

The large-sized substrate is, for example, a substrate having at least one side of 1000 mm or more.

The temperature $T_2$ of the alkali-free glass according to the present disclosure is preferably 1900° C. or lower. If $T_2$ is 1900° C. or lower, the glass is excellent in meltability and burden on the production equipment can be reduced. For example, a life of equipment such as a furnace for melting glass can be extended, and the productivity can be improved. In addition, defects derived from the furnace, for example, crack defects and Zr defects can be reduced. $T_2$ is more preferably 1850° C. or less, even more preferably 1800° C. or less, still more preferably 1755° C. or less, still even more preferably 1750° C. or less, and yet still even more preferably 1745° C. or less.

The lower limit of the temperature $T_2$ is not particularly limited, and is preferably, for example, 1500° C. or higher.

The temperature $T_4$ of the glass according to the present disclosure is preferably 1290° C. or lower. If the temperature $T_4$ is 1290° C. or lower, the glass is excellent in formability. In addition, for example, by lowering the temperature at the time of forming the glass, it is possible to reduce an amount of volatile matter in an atmosphere around the glass and to further reduce the defects of the glass. Since the glass can be formed at a low temperature, the burden on the production equipment can be reduced. For example, the life of equipment such as a float bath for forming the glass can be extended, and the productivity can be improved. The temperature $T_4$ is more preferably 1280° C. or lower.

The lower limit of the temperature $T_4$ is not particularly limited, and is preferably, for example, 1050° C. or higher.

The temperature $T_2$ and the temperature $T_4$ can be determined in accordance with a method specified in ASTM C965-96 (2017), by measuring a viscosity using a rotary viscometer, and determining temperatures when the viscosity reaches $10^2$ dPa·s or $10^4$ dPa·s. In Examples to be described later, NBS 710 and NIST 717a were used as reference samples for device calibration.

The Tg of the glass according to the present disclosure is preferably 700° C. or lower. If the Tg is 700° C. or lower, it is possible to avoid the need to increase the temperature of an annealing device and to prevent a decrease in the life of the annealing device. The Tg is more preferably 680° C. or lower, even more preferably 670° C. or lower.

The lower limit of the temperature Tg is not particularly limited, and is preferably, for example, 450° C. or higher.

The annealing point of the glass according to the present disclosure is preferably 700° C. or lower. If the annealing point is 700° C. or lower, it is possible to avoid the need to increase the temperature of the annealing device and to prevent a decrease in the life of the annealing device. The annealing point is more preferably 680° C. or lower, even more preferably 670° C. or lower.

The lower limit of the annealing point is not particularly limited, and is preferably, for example, 450° C. or higher.

The surface devitrification temperature of the glass according to the present disclosure is preferably 1400° C. or lower. If the surface devitrification temperature is 1400° C. or lower, the glass is excellent in formability. It is possible to prevent a decrease in transmittance due to generation of crystals inside the glass during formation. In addition, a load on the production equipment can be reduced. For example, the life of equipment such as a float bath for forming the glass can be extended, and the productivity can be improved.

The surface devitrification temperature is more preferably 1280° C. or lower, even more preferably 1260° C. or lower, still more preferably 1255° C. or lower, still even more preferably 1250° C. or lower, yet still even more preferably 1245° C. or lower, and even more preferably 1240° C. or lower.

The lower limit of the surface devitrification temperature is not particularly limited, and is preferably, for example, 900° C. or higher.

The surface devitrification temperature in the present disclosure can be determined as follows. That is, the pulverized glass particles are placed into a platinum dish, heat treatment is performed for 17 hours in an electric furnace controlled at a constant temperature, a maximum temperature at which crystals are precipitated on the surface of the glass and a minimum temperature at which crystals are not precipitated are observed using an optical microscope after the heat treatment, and an average value thereof is defined as the surface devitrification temperature.

The average coefficient of thermal expansion at 50° C. to 350° C. of the glass according to the present disclosure is preferably $20 \times 10^{-7}$/° C. or more. If the average coefficient of thermal expansion at 50 to 350° C. is $20 \times 10^{-7}$/° C. or more, when the glass is used as the glass substrate, it is possible to prevent breakage due to an excessively large difference in coefficient of expansion from a metal film formed on the glass substrate.

The average coefficient of thermal expansion at 50 to 350° C. is more preferably $25 \times 10^{-7}$/° C. or more.

On the other hand, the average coefficient of thermal expansion at 50 to 350° C. is preferably $50 \times 10^{-7}$/° C. or less. If the average coefficient of thermal expansion at 50 to 350° C. is $50 \times 10^{-7}$/° C. or less, it is possible to prevent the breakage of the glass during a product manufacturing process of a high-frequency device and the like.

The average coefficient of thermal expansion at 50 to 350° C. is more preferably $40 \times 10^{-7}$/° C. or less, even more preferably $35 \times 10^{-7}$/° C. or less, and still more preferably $32 \times 10^{-7}$/° C. or less.

The Young's modulus of the glass according to the present disclosure is preferably 40 GPa or more. If the Young's modulus is within the above range, it is possible to prevent the occurrence of defects such as warping, bending, and breakage of the glass substrate after the formation of the metal film, for example, a Cu film, which is performed in the manufacturing process of the high-frequency device. The Young's modulus is more preferably 43 GPa or more, even more preferably 45 GPa or more, and still more preferably 47 GPa or more.

The upper limit of the Young's modulus is not particularly limited, and is preferably, for example, 70 GPa or less.

The specific elastic modulus of the glass according to the present disclosure is preferably 20 GPa·cm³/g or more. If the specific elastic modulus is within the above range, a deflection amount of the glass can be reduced. The specific elastic modulus is more preferably 21 GPa·cm³/g or more, and even more preferably 22 GPa·cm³/g or more.

The upper limit of the specific elastic modulus is not particularly limited, and is preferably, for example, 35 GPa·cm³/g or less.

In the glass according to the present disclosure, an elution amount of a glass component per unit surface area when immersed in an aqueous solution at 45° C. containing 6 mass % of $HNO_3$ and 5 mass % of $H_2SO_4$ for 170 seconds is preferably 0.02 mg/cm² or less. If the elution amount of the glass component is within the above range, the acid resistance is good. The elution amount of the glass component is more preferably 0.015 mg/cm² or less.

The lower limit of the elution amount of the glass component is not particularly limited, and is preferably, for example, 0.0001 mg/cm² or more.

When the glass according to the present disclosure is formed into a glass plate having a plate thickness of 1 mint, a haze value of the glass plate is preferably 0.5% or less. If the haze value is within the above range, the glass is excellent in the phase separation stability, and for example, when the glass substrate is subjected to the acid cleaning, it is possible to suitably prevent local irregularities from being generated on the substrate surface. Accordingly, the transmission loss of the high-frequency signal can be reduced. The haze value is more preferably 0.4% or less, even more preferably 0.3% or less, still more preferably 0.2% or less, and still even more preferably 0.1% or less.

The lower limit of the haze value is not particularly limited, and is preferably, for example, 0.01% or more.

A glass plate including the glass according to the present disclosure (hereinafter, referred to as the glass plate according to the present disclosure) is suitable for a glass substrate for a high-frequency device, a panel antenna, a window glass, a vehicle window glass, a cover glass for a touch panel, and the like due to the above-described characteristics.

FIG. 1 is a cross-sectional view showing an example of a configuration of a circuit substrate for the high-frequency device. A circuit substrate 1 shown in FIG. 1 includes a glass substrate 2 having insulating properties, a first wiring layer 3 formed on a first main surface 2a of the glass substrate 2, and a second wiring layer 4 formed on a second main surface 2b of the glass substrate 2. The first and second wiring layers 3 and 4 form a microstrip line as an example of a transmission line. The first wiring layer 3 constitutes a signal wiring, and the second wiring layer 4 constitutes a ground line. However, structures of the first and second wiring layers 3 and 4 are not limited thereto. The wiring layer may be formed only on one main surface of the glass substrate 2.

The first and second wiring layers 3 and 4 are layers formed of a conductor, and thicknesses thereof are usually about 0.1 to 50 μm. The conductor forming the first and second wiring layers 3 and 4 is not particularly limited, and for example, a metal such as copper, gold, silver, aluminum, titanium, chromium, molybdenum, tungsten, platinum, or nickel, or an alloy or a metal compound containing at least one of these metals is used. The structure of the first and second wiring layers 3 and 4 is not limited to a single-layer structure, and may have a multi-layer structure such as a laminated structure of a titanium layer and a copper layer. A method of forming the first and second wiring layers 3 and 4 is not particularly limited, and various known forming methods such as a printing method using a conductor plate, a dipping method, a plating method, a vapor deposition method, and a sputtering method can be applied.

When the glass plate according to the present disclosure is used as the glass substrate 2, the dielectric loss tangent (tan δ) at 35 GHz of the glass substrate 2 is preferably 0.005 or less. If the dielectric loss tangent at 35 GHz of the glass substrate 2 is 0.005 or less, the dielectric loss can be reduced in a high-frequency region exceeding 30 GHz. The dielectric loss tangent at 35 GHz of the glass substrate 2 is more preferably 0.004 or less, even more preferably 0.003 or less, still more preferably 0.0025 or less, still even more preferably 0.002 or less, and yet still even more preferably 0.0015 or less.

If the relative permittivity at 35 GHz of the glass substrate 2 is 5 or less, the dielectric loss in the high-frequency region can be reduced, which is preferable. The relative permittivity at 35 GHz of the glass substrate 2 is more preferably 4.8 or less, even more preferably 4.7 or less, still more preferably 4.6 or less, still even more preferably 4.5 or less, yet still even more preferably 4.3 or less, even more preferably 4.1 or less, still even more preferably 4 or less, and yet still even more preferably 3.8 or less.

Further, the glass substrate 2 includes the main surfaces 2a and 2b and end surfaces. It is preferable that at least one of the main surfaces 2a and 2b of the glass substrate 2 on which the first and second wiring layers 3 and 4 are formed preferably has an arithmetic mean roughness Ra of 1.5 nm or less as a surface roughness thereof, and it is more preferable that both main surfaces have an arithmetic mean roughness Ra of 1.5 nm or less. If the arithmetic mean roughness Ra of the main surface is within the above range, a skin resistance of the first and second wiring layers 3 and 4 can be reduced even when a skin effect occurs in the first and second wiring layers 3 and 4 in a high-frequency region exceeding 30 GHz, and the conductor loss is further reduced. The arithmetic mean roughness Ra of the main surfaces 2a and 2b of the glass substrate 2 is even more preferably 1 nm or less, and still more preferably 0.5 nm or less. The main surface of the glass substrate 2 refers to a surface on which the wiring layer is formed. When the wiring layer is formed on one main surface, a value of the arithmetic mean roughness Ra of the one main surface may satisfy 1.5 nm or less. The arithmetic mean roughness Ra in the present specification means a value according to JIS B0601 (2001).

The surface roughness of the main surfaces 2a and 2b of the glass substrate 2 can be implemented by a polishing treatment of the surface of the glass substrate 2 as necessary. As the polishing treatment of the surface of the glass substrate 2, for example, polishing using a polishing agent containing cerium oxide, colloidal silica, or the like as a main component and a polishing pad; polishing using a polishing slurry containing a polishing agent and an acidic or alkaline dispersion medium and a polishing pad; or polishing using an acidic or alkaline etchant can be applied. These polishing treatments are applied according to the surface roughness of a base plate of the glass substrate 2. For example, preliminary polishing and final polishing may be applied in combination. The end surface of the glass substrate 2 is preferably chamfered in order to prevent breakage, cracking, and chipping of the glass substrate 2 caused by the end surface during a process flow. A form of chamfering may be C chamfering, R chamfering, thread chamfering, or the like.

By using such a glass substrate 2, the transmission loss of the circuit substrate 1 at 35 GHz can be reduced. For example, the transmission loss can be reduced to 1 dB/cm or less. Accordingly, since characteristics such as quality and strength of a high-frequency signal, particularly a high-frequency signal exceeding 30 GHz, and a high-frequency signal of 35 GHz or more are maintained, it is possible to provide the glass substrate 2 and the circuit substrate 1 suitable for a high-frequency device handling such a high-frequency signal. That is, the characteristics and the quality of the high-frequency device handling such a high-frequency signal can be improved. The transmission loss of the circuit substrate 1 at 35 GHz is preferably 0.5 dB/cm or less.

The shape of the glass plate according to the present disclosure is not particularly limited, and the thickness is preferably 0.7 mm or less. If the thickness of the glass plate is 0.7 mm or less, when the glass plate is used as the glass substrate for the high-frequency device, it is possible to reduce the thickness and the size of the high-frequency device, and further improve production efficiency. In addition, ultraviolet transmittance is improved, and an ultraviolet curable material can be used in the manufacturing process of the device to improve the productivity. The thickness of the glass plate is more preferably 0.6 mm or less, even more preferably 0.5 mm or less, still more preferably 0.4 mm or less, still even more preferably 0.3 mm or less, yet still even more preferably 0.2 mm or less, and even more preferably 0.1 mm or less. The lower limit is about 0.01 mm.

When the glass plate is a large-sized substrate, at least one side is preferably 1000 mm or more, more preferably 1500 mm or more, and even more preferably 1800 mm or more. The upper limit is not particularly limited, and the size of one side is usually 4000 mm or less. The glass plate is preferably rectangular.

Next, a manufacturing method of the glass plate according to the present disclosure will be described. In the case of manufacturing the glass plate, the glass plate undergoes a melting step of heating a glass raw material to obtain a molten glass, a refining step of removing bubbles from the molten glass, a forming step of forming the molten glass into a plate shape to obtain a glass ribbon, and an annealing step of gradually cooling the glass ribbon to a room temperature state. Alternatively, a method may be used in which the molten glass is formed into a block shape, annealed, and then cut and polished to manufacture a glass plate.

In the melting step, raw materials are prepared to have a target glass composition, and the raw materials are continuously put into a melting furnace and heated to preferably about 1450 to 1750° C. to obtain molten glass. Since the alkali-free glass according to the embodiment has a low resistance value in a temperature range in which the glass raw material is melted, for example, around 1500° C., it is preferable to use an electric melting furnace as the melting furnace and melt the glass by electrical heating. However, the electrical heating and heating by a burner may be used in combination.

As the raw material, an oxide, a carbonate, a nitrate, a hydroxide, a halide such as a chloride, and the like can also be used. When there is a step of bringing the molten glass into contact with platinum in the melting or refining step, fine platinum particles may be eluted into the molten glass and mixed in the obtained glass plate as foreign substances. The use of nitrate raw materials has an effect of preventing formation of platinum foreign substances.

Examples of the nitrate include strontium nitrate, barium nitrate, magnesium nitrate, and calcium nitrate. It is more preferable to use strontium nitrate. As for the particle size of the raw material, raw materials having a large particle diameter of several hundred μm to such an extent that undissolved residue does not occur to raw materials having a small particle diameter of several μm to such an extent that scattering does not occur at the time of conveying the raw material and aggregation does not occur as secondary particles, can be appropriately used. A granular body can also be used. In order to prevent scattering of the raw material, a water content of the raw material can also be appropriately adjusted. Dissolution conditions such as the β-OH value and an oxidation-reduction degree of Fe (redox $[Fe^{2+}/(Fe^{2+}+Fe^{3+})]$) can also be appropriately adjusted.

The next refining step is a step of removing bubbles from the molten glass obtained in the melting step. As the refining step, a defoaming method under reduced pressure may be applied, or defoaming may be performed at a temperature higher than a melting temperature of the raw material. In addition, $SO_3$ or $SnO_2$ can be used as a refining agent. As a $SO_3$ source, a sulfate of at least one element selected from Al, Na, K, Mg, Ca, Sr, and Ba is preferable, and a sulfate of an alkali earth metal is more preferable, and among these, $CaSO_4 \cdot 2H_2O$, $SrSO_4$, and $BaSO_4$ are particularly preferable because an action of enlarging bubbles is remarkable.

As the refining agent used in the defoaming method under the reduced pressure, it is preferable to use a halogen such as Cl or F. As a Cl source, a chloride of at least one element selected from Al, Mg, Ca, Sr, and Ba is preferable, a chloride of an alkali earth metal is more preferable, and among these, $SrCl_2 \cdot 6H_2O$ and $BaCl_2 \cdot 2H_2O$ are even more preferable because the action of enlarging bubbles is remarkable and deliquescence is low. As a F source, a fluoride of at least one element selected from Al, Na, K, Mg, Ca, Sr, and Ba is preferable, a fluoride of an alkali earth metal is more preferable, and among these, $CaF_2$ is even more preferable because an action of increasing the meltability of the glass raw material is remarkable.

A tin compound represented by $SnO_2$ generates $O_2$ gas in a glass melting liquid. In the glass melting liquid, $SnO_2$ is reduced to SnO at a temperature of 1450° C. or higher to generate the $O_2$ gas, thereby having an effect of growing bubbles largely. At the time of manufacturing the glass plate, since the glass raw material is heated to about 1450 to 1750° C. and melted, bubbles in the glass melting liquid are more effectively enlarged. When $SnO_2$ is used as the refining agent, the raw material is preferably prepared to contain the tin compound in an amount of 0.01% or more in terms of $SnO_2$ with respect to 100% of a total amount of a matrix composition. When the content of $SnO_2$ is 0.01% or more, a refining effect during melting of the glass raw material is preferably obtained. The content of $SnO_2$ is more preferably 0.05% or more, and even more preferably 0.1% or more. If the content of $SnO_2$ is 0.3% or less, coloring or devitrification of the glass is prevented, which is preferable. The content of the tin compound in the glass is more preferably 0.25% or less, even more preferably 0.2% or less, and still more preferably 0.15% or less in terms of $SnO_2$ with respect to 100% of the total amount of a glass matrix composition.

The next forming step is a step of obtaining a glass ribbon by forming the molten glass from which bubbles are removed in the refining step into a plate shape. As the forming step, a known method of forming the glass into the plate shape, such as a float process in which a molten glass is flowed over a molten metal such as tin to form into a plate shape to obtain a glass ribbon, an overflow down draw process (a fusion process) in which a molten glass flows downward from a gutter-shaped member, or a slit down draw process in which a molten glass is caused to flow downward from a slit, can be applied. Among these, the float process or the fusion process is preferable in terms of non-polishing and light polishing.

Next, the annealing step is a step of cooling the glass ribbon obtained in the forming step under a cooling condition controlled to a room temperature state. In the annealing step, the glass ribbon is cooled, and then annealed to the room temperature state under a predetermined condition. The annealed glass ribbon is cut to obtain the glass plate.

If a cooling rate R in the annealing step is too high, the strain tends to remain in the cooled glass. In addition, an equivalent cooling rate which is a parameter reflecting a virtual temperature is too high, and as a result, shrinkage of the glass cannot be reduced. Therefore, R is preferably set so that the equivalent cooling rate is 800° C./min or less. The equivalent cooling rate is more preferably 400° C./min or less, even more preferably 100° C./min or less, and still more preferably 50° C./min or less. On the other hand, if the cooling rate is too low, time required for the step is too long, resulting in low productivity. Therefore, R is preferably set so that the equivalent cooling rate is 0.1° C./min or more, more preferably 0.5° C./min or more, and even more preferably 1° C./min or more. The equivalent cooling rate which is the parameter reflecting the virtual temperature is preferably an equivalent cooling rate based on a refractive index in terms of ease of evaluation, and may be an equivalent cooling rate based on tan δ.

Here, a definition of the equivalent cooling rate based on the refractive index and an evaluation method thereof are as follows. A glass having a target composition is processed into a rectangular body of 10 mm×10 mm×0.3 to 2.0 mm to obtain a glass sample. Using an infrared heating type electric furnace, the glass sample is held above 170° C. of the strain point for 5 minutes, and then the glass sample is cooled to the room temperature (25° C.). At this time, a plurality of glass samples are produced by changing the cooling rate in a range of 1° C./min to 1000° C./min.

Using a precision refractive index measurement device (for example, KPR 2000 manufactured by Shimadzu Device Corporation), a refractive index $n_d$ of a d-line (a wavelength of 587.6 nm) of the plurality of glass samples is measured. For the measurement, a V-block method or a minimum angle of deviation method may be used. A calibration curve of $n_d$ against the cooling rate is obtained by plotting the obtained $n_d$ against a logarithm of the cooling rate.

Next, $n_d$ of glasses having the same composition which are actually manufactured through steps such as melting, forming, and cooling is measured by the above measurement method. A corresponding cooling rate (referred to as the equivalent cooling rate in the embodiment) corresponding to the obtained $n_d$ is determined based on the calibration curve.

The manufacturing method of the glass plate according to the present disclosure is not limited to the above. For example, when the glass plate according to the present disclosure is manufactured, the glass may be formed into a plate shape by a press forming method of directly forming the molten glass into the plate shape.

When the glass plate according to the present disclosure is manufactured, in addition to the manufacturing method using a melting bath made of a refractory, a crucible made of platinum or an alloy containing platinum as a main component (hereinafter, referred to as a platinum crucible) may be used in the melting bath or a refining bath. In the case of using the platinum crucible, in the melting step, raw materials are prepared to have a composition of a glass plate to be obtained, and the platinum crucible containing the raw materials is heated in an electric furnace, preferably heated to about 1450 to 1700° C. A platinum stirrer is inserted and stirred for 1 to 3 hours to obtain the molten glass.

In the forming step in a manufacturing process of the glass plate using a platinum crucible, the molten glass is poured onto, for example, a carbon plate or a molding frame to form a plate shape or a block shape. In the annealing step, the temperature is typically maintained at about Tg+50° C., and then cooled to near the strain point at about 1 to 10° C./min, and then cooled to the room temperature state at a cooling rate at which the strain does not remain. After cutting into a predetermined shape and polishing, the glass plate is obtained. The glass plate obtained by cutting may be heated, for example, to about Tg+50° C., and then annealed to the room temperature state at the predetermined cooling rate. In this way, the equivalent cooling rate of the glass can be adjusted.

The circuit substrate 1 using the glass plate according to the present disclosure as the glass substrate 2 is suitable for a high-frequency device handling a high-frequency signal, in particular, a high-frequency signal exceeding 30 GHz or a high-frequency signal of 35 GHz or more. By reducing the transmission loss of such high-frequency signals, it is possible to improve characteristics such as quality and strength of the high-frequency signals. The circuit substrate 1 using the glass plate according to the present disclosure as the glass substrate 2 is suitable for a high-frequency device (an electronic device) such as a semiconductor device used in a communication device such as a mobile phone, a smartphone, a portable information terminal, or a Wi-Fi device, a surface acoustic wave (SAW) device, a radar component such as a radar transceiver, an antenna component such as a liquid crystal antenna or a panel antenna, and the like.

That is, the present disclosure relates not only to a glass substrate for a high-frequency device including the glass according to the present disclosure, but also to a panel antenna including the glass according to the present disclosure.

The glass according to the present disclosure can also be suitably applied to other products for the purpose of reducing the transmission loss of the high-frequency signals. That is, the present disclosure also relates to a window glass, a vehicle window glass, and a cover glass for a touch panel including the glass according to the present disclosure.

The glass plate including the glass according to the present disclosure can stably transmit and receive radio waves in a high-frequency band, and is less likely to be damaged or broken, and thus is suitable for the window glass, the vehicle window glass, and the cover glass for the touch panel. As the vehicle window glass, for example, a vehicle window glass for automatic driving is more preferable.

EXAMPLES

Examples will be described below, and the present disclosure is not limited to these examples. In the following, Examples 1 to 14, 16, 29 to 37, 39 to 46, 50 to 64 are working examples and Examples 17 to 28, 47 to 49 are comparative examples.

A glass plate having compositions (represented by mol % based on oxides) shown in Tables 1 to 11, a thickness of 1.0 mm, a shape of 50×50 mm, and an arithmetic mean roughness Ra of a main surface of 1.0 nm was prepared. The glass plate was produced by a melting method using a platinum crucible. Raw materials such as silica sand were mixed to obtain glasses having the compositions shown in Tables 1 to 11, and a batch of 1 kg was prepared. The raw materials were placed in the platinum crucible and melted by heating at a temperature of 1650° C. for 3 hours in an electric furnace to obtain a molten glass. For melting, a platinum stirrer was inserted into the platinum crucible and stirred for 1 hour to homogenize the glass. The molten glass was poured onto a carbon plate and formed into a plate shape, and then the plate-shaped glass was placed in an electric furnace at a temperature of about Tg+50° C. and held for 1 hour. The temperature of the electric furnace was lowered to Tg−100° C. at a cooling rate of 1° C./min. Thereafter, the glass was cut and polished into a plate shape to obtain a glass plate.

For the glass plates in Examples 1 to 14, Examples 16 to 37, Examples 39 to 40, and Examples 50 to 64, an average coefficient of thermal expansion at 50 to 350° C., a density, a Tg, a Young's modulus, a specific elastic modulus, a temperature $T_2$, a temperature $T_4$, a relative permittivity at 10 GHz or 35 GHz, a dielectric loss tangent at 10 GHz or 35 GHz, tan $\delta$100−tan $\delta$10, a surface devitrification temperature, an elution amount of a glass component per unit surface area when immersed in an aqueous solution of 45° C. containing 6 mass % of $HNO_3$ and 5 mass % of $H_2SO_4$ for 170 seconds (6% $HNO_3$+5% $H_2SO_4$@45° C.×170 sec) as acid resistance evaluation, haze evaluation, and a β-OH value are shown in Tables 1 to 6 and Tables 9 to 11. The haze evaluation is an index of phase separation stability of glass. Values shown in parentheses in the tables mean calculated values or estimated values, and blank columns mean unmeasured values. For the glass plates in Examples 41 to 49, the β-OH value, the equivalent cooling rate based on tan $\delta$, tan $\delta$A, and tan $\delta$100−tan $\delta$A are shown in Tables 7 and 8.

Methods of measuring physical properties are shown below.

(Average Coefficient of Thermal Expansion)

Measurement was performed using a differential thermal expansion meter in accordance with a method defined in JIS R3102 (1995). A measurement temperature range was 50 to 350° C., and the unit was ×10$^{-7}$/° C.

(Density)

The density of about 20 g of bubble-free glass lumps was measured by the Archimedes method.

(Tg)

Measurement was performed by a thermal expansion method in accordance with a method defined in JIS R3103-3 (2001).

(Young's Modulus)

In accordance with a method defined in JIS Z2280 (1993), a glass having a thickness of 0.5 to 10 mm was measured by an ultrasonic pulse method. The unit was GPa.

(Specific Elastic Modulus)

The specific elastic modulus (GPa·cm$^3$/g) was calculated by dividing the Young's modulus measured by the above-described method by the density measured by the same method.

(Temperature $T_2$)

In accordance with a method defined in ASTM C 965-96, a viscosity was measured using a rotary viscometer, and the temperature $T_2$ (° C.) at which the viscosity was $10^2$ dPa·s was measured.

(Temperature $T_4$)

In accordance with a method defined in ASTM C 965-96, the viscosity was measured using the rotary viscometer, and the temperature $T_4$ (° C.) at which the viscosity was $10^4$ dPa·s was measured.

(Relative Permittivity and Dielectric Loss Tangent)

Measurement was performed using a cavity resonator and a vector network analyzer in accordance with a method defined in JIS R1641 (2007). A measurement frequency is 10 GHz or 35 GHz, which is a resonance frequency of air of the cavity resonator.

(tan δ100−tan δ10)

The glass plate is placed in an electric furnace, heated to (Tg+50) °C., held for 1 hour, and then cooled to (Tg−150) °C. at a cooling rate of 10° C./min, and then the dielectric loss tangent at 10 GHz is measured and set as tan δ10.

The glass plate is placed in the electric furnace, heated to (Tg+50) °C., held for 1 hour, and then cooled to (Tg−150) °C. at a cooling rate of 100° C./min, and then the dielectric loss tangent at 10 GHz is measured and set as tan δ100.

tan δ100−tan δ10 is determined as a difference between the two values.

(Surface Devitrification Temperature)

The glass was pulverized and classified using a test sieve to have a particle diameter of 2 to 4 mm. The obtained glass cullet was subjected to ultrasonic cleaning in isopropyl alcohol for 5 minutes, washed with ion exchange water, dried, placed in a platinum dish, and subjected to heat treatment in the electric furnace controlled at a constant temperature for 17 hours. The temperature of the heat treatment was set at intervals of 10° C.

After the heat treatment, the glass was removed from the platinum dish, and a maximum temperature at which crystals were precipitated on a surface of the glass and a minimum temperature at which crystals were not precipitated were observed using an optical microscope.

The maximum temperature at which the crystals were precipitated on the surface of the glass and the minimum temperature at which the crystals were not precipitated were each measured once. When it is difficult to determine the precipitation of the crystals, the measurement may be performed twice.

An average value of measurement values of the maximum temperature at which the crystals were precipitated on the surface of the glass and the minimum temperature at which the crystals were not precipitated was determined as the surface devitrification temperature.

(Acid Resistance, 6% $HNO_3$+5% $H_2SO_4$ @ 45° C.×170 Sec)

The glass sample was immersed in an acid aqueous solution (6 mass % $HNO_3$+5 mass % $H_2SO_4$, 45° C.) for 170 seconds, and the elution amount ($mg/cm^2$) of the glass component per unit surface area was evaluated. If the elution amount of the glass component is 0.02 $mg/cm^2$ or less, the acid resistance is good.

(Haze Evaluation)

A haze value of the glass was measured using a haze meter (manufacturer: Suga Test Instruments Co., Ltd., model: HZ-V3 Hazemeter). The haze value is measured using a glass plate having a plate thickness of 1 mmt and both surfaces of which are mirror-polished. Measurement values were evaluated according to the following criteria.

A: 0.5% or less (transparency is fine)
B: more than 0.5% and 1% or less (slight phase separation (slight white turbidness))
C: more than 1% (obvious phase separation (white turbidness))

(β-OH Value)

The β-OH value is obtained by measuring an absorbance of a glass sample with respect to light having a wavelength of 2.75 to 2.95 μm, and dividing a maximum value $β_{max}$ of the absorbance by a thickness (mm) of the sample.

TABLE 1

| mol % | Example 1 | Example 2 | Example 3 | Example 4 | Example 5 | Example 6 | Example 7 |
|---|---|---|---|---|---|---|---|
| $SiO_2$ | 74.0 | 71.8 | 69.7 | 66.8 | 64.3 | 61.8 | 65.0 |
| $Al_2O_3$ | 4.0 | 4.0 | 4.0 | 4.0 | 4.0 | 4.0 | 5.0 |
| $B_2O_3$ | 18.0 | 20.0 | 22.0 | 25.0 | 27.5 | 30.0 | 25.0 |
| MgO | 3.2 | 3.8 | 3.8 | 3.8 | 3.2 | 3.2 | 4.0 |
| CaO | 0.0 | 0.0 | 0.0 | 0.0 | 0.0 | 0.0 | 0.0 |
| SrO | 0.0 | 0.2 | 0.2 | 0.2 | 0.8 | 0.8 | 0.8 |
| BaO | 0.8 | 0.2 | 0.2 | 0.2 | 0.2 | 0.2 | 0.2 |
| $Li_2O$ | 0.00 | 0.02 | 0.00 | 0.00 | 0.00 | 0.05 | 0.20 |
| $Na_2O$ | 0.01 | 0.01 | 0.10 | 0.05 | 0.05 | 0.03 | 0.01 |
| $K_2O$ | 0.00 | 0.05 | 0.00 | 0.05 | 0.00 | 0.00 | 0.00 |
| $Fe_2O_3$ | 0.00 | 0.00 | 0.00 | 0.00 | 0.00 | 0.00 | 0.00 |
| total | 100.0 | 100.0 | 100.0 | 100.0 | 100.0 | 100.0 | 100.0 |
| $[Li_2O] + [Na_2O] + [K_2O]$ | 0.01 | 0.08 | 0.10 | 0.10 | 0.05 | 0.08 | 0.21 |
| Formula (A) | 4.0 | 4.2 | 4.2 | 4.2 | 4.2 | 4.2 | 5.0 |
| Formula (B) | 0.0 | −0.2 | −0.2 | −0.2 | −0.2 | −0.2 | 0.0 |
| Formula (C) | 92.0 | 91.8 | 91.8 | 91.8 | 91.8 | 91.8 | 90.0 |
| Formula (D) | 0.22 | 0.20 | 0.18 | 0.16 | 0.15 | 0.13 | 0.20 |
| Formula (E) | 0.80 | 0.90 | 0.90 | 0.90 | 0.76 | 0.76 | 0.80 |
| Formula (F) | 1.00 | 1.05 | 1.05 | 1.05 | 1.05 | 1.05 | 1.00 |
| Formula (G) | 0.00 | 0.25 | 0.00 | 0.00 | 0.00 | 0.63 | 0.95 |
| Formula (H) | 0.25 | 0.05 | 0.05 | 0.05 | 0.06 | 0.06 | 0.05 |
| Formula (I) | 56 | 52 | 48 | 42 | 37 | 32 | 40 |
| Formula (J) | 0.25 | 0.11 | 0.11 | 0.11 | 0.31 | 0.31 | 0.25 |
| Average coefficient of thermal expansion ($×10^{−7}$/° C.) | 25.9 | 26.2 | 26.9 | 27.9 | 29.3 | 30.2 | 29.0 |
| Density ($g/cm^3$) | 2.22 | 2.20 | 2.19 | 2.18 | 2.18 | 2.17 | 2.20 |
| Tg (° C.) | 648 | 617 | 607 | 586 | 511 | 493 | 533 |
| Young's modulus (GPa) | 57 | 57 | 55 | 53 | 51 | 49 | 54 |
| Specific elastic modulus | 26 | 26 | 25 | 24 | 23 | 23 | 25 |

TABLE 1-continued

| mol % | Example 1 | Example 2 | Example 3 | Example 4 | Example 5 | Example 6 | Example 7 |
|---|---|---|---|---|---|---|---|
| Temperature $T_2$ (° C.) | 1935 | (1852) | (1817) | (1763) | (1720) | 1733 | (1721) |
| Temperature $T_4$ (° C.) | 1437 | (1394) | (1363) | (1317) | (1277) | 1256 | (1288) |
| Relative permittivity@10 GHz | 4.1 | 4.0 | 4.0 | 4.0 | 4.0 | 4.0 | 4.1 |
| Relative permittivity@35 GHz | (4.1) | (4.0) | (4.0) | (4.0) | (4.0) | (4.0) | (4.1) |
| Dielectric loss tangent@10 GHz | 0.0013 | 0.0011 | 0.0011 | 0.0010 | 0.0010 | 0.0010 | 0.0012 |
| Dielectric loss tangent@35 GHz | (0.0018) | (0.0015) | (0.0015) | (0.0015) | (0.0014) | (0.0014) | (0.0017) |
| tanδ100-tanδ10 | 0.00026 | (0.00023) | 0.00025 | (0.00023) | (0.00023) | 0.00018 | 0.00028 |
| Surface devitrification temperature (° C.) | 1250 | <1200 | <1200 | <1200 | <1200 | <1220 | <1220 |
| 6% $HNO_3$ + 5% $H_2SO_4$@45° C. × 170 sec (mg/cm$^2$) | 0.005 | 0.003 | 0.005 | 0.004 | 0.006 | 0.009 | 0.008 |
| Haze evaluation | A | A | A | A | A | A | A |
| β-OH value (mm$^{-1}$) | 0.30 | 0.34 | 0.55 | 0.45 | 0.20 | 0.60 | 0.50 |

In the table, formulas (A) to (J) respectively mean the following.

[MgO]+[CaO]+[SrO]+[BaO]  Formula (A):

[Al$_2$O$_3$]—([MgO]+[CaO]+[SrO]+[BaO])  Formula (B):

[SiO$_2$]+[B$_2$O$_3$]  Formula (C):

[Al$_2$O$_3$]/[B$_2$O$_3$]  Formula (D):

[MgO]/([MgO]+[CaO]+[SrO]+[BaO])  Formula (E):

([MgO]+[CaO]+[SrO]+[BaO])/[Al$_2$O$_3$]  Formula (F):

[Li$_2$O]/([Li$_2$O]+[Na$_2$O]+[K$_2$O])  Formula (G):

[BaO]/[MgO]  Formula (H):

[SiO$_2$]—[B$_2$O$_3$]  Formula (I):

([SrO]+[BaO])/([MgO]+[CaO])  Formula (J):

TABLE 2

| mol % | Example 8 | Example 9 | Example 10 | Example 11 | Example 12 | Example 13 | Example 14 |
|---|---|---|---|---|---|---|---|
| SiO$_2$ | 59.3 | 59.8 | 61.9 | 62.5 | 65.0 | 66.5 | 64.0 |
| Al$_2$O$_3$ | 4.0 | 6.0 | 4.0 | 5.0 | 3.0 | 3.0 | 6.0 |
| B$_2$O$_3$ | 32.5 | 30.0 | 30.0 | 28.0 | 28.0 | 26.0 | 25.0 |
| MgO | 3.2 | 3.2 | 4.0 | 1.5 | 2.0 | 2.0 | 2.0 |
| CaO | 0.0 | 0.0 | 0.0 | 2.0 | 1.5 | 2.0 | 2.0 |
| SrO | 0.8 | 0.8 | 0.0 | 1.0 | 0.5 | 0.5 | 0.8 |
| BaO | 0.2 | 0.2 | 0.0 | 0.0 | 0.0 | 0.0 | 0.2 |
| Li$_2$O | 0.03 | 0.00 | 0.10 | 0.00 | 0.02 | 0.00 | 0.05 |
| Na$_2$O | 0.02 | 0.02 | 0.02 | 0.01 | 0.01 | 0.10 | 0.05 |
| K$_2$O | 0.00 | 0.00 | 0.00 | 0.00 | 0.00 | 0.00 | 0.00 |
| Fe$_2$O$_3$ | 0.00 | 0.00 | 0.00 | 0.00 | 0.00 | 0.00 | 0.00 |
| total | 100.0 | 100.0 | 100.0 | 100.0 | 100.0 | 100.0 | 100.0 |
| [Li$_2$O] + [Na$_2$O] + [K$_2$O] | 0.05 | 0.02 | 0.12 | 0.01 | 0.08 | 0.10 | 0.10 |
| Formula (A) | 4.2 | 4.2 | 4.0 | 4.5 | 4.0 | 4.5 | 5.0 |
| Formula (B) | −0.2 | 1.8 | 0.0 | 0.5 | −1.0 | −1.5 | 1.0 |
| Formula (C) | 91.8 | 89.8 | 92.0 | 90.5 | 93.0 | 92.5 | 89.0 |
| Formula (D) | 0.12 | 0.20 | 0.13 | 0.18 | 0.11 | 0.12 | 0.24 |
| Formula (E) | 0.76 | 0.76 | 1.00 | 0.33 | 0.50 | 0.44 | 0.40 |
| Formula (F) | 1.05 | 0.70 | 1.00 | 0.90 | 1.33 | 1.50 | 0.83 |
| Formula (G) | 0.60 | 0.00 | 0.83 | 0.00 | 0.25 | 0.00 | 0.50 |
| Formula (H) | 0.06 | 0.06 | 0.00 | 0.00 | 0.00 | 0.00 | 0.10 |
| Formula (I) | 27 | 30 | 32 | 35 | 37 | 41 | 39 |
| Formula (J) | 0.31 | 0.31 | 0.00 | 0.29 | 0.14 | 0.13 | 0.25 |
| Average coefficient of thermal expansion (×10$^{-7}$/° C.) | 31.0 | 30.2 | 30.2 | 31.1 | 29.8 | 29.9 | 30.5 |
| Density (g/cm$^3$) | 2.16 | 2.18 | 2.18 | 2.19 | 2.16 | 2.17 | 2.22 |
| Tg (° C.) | 475 | 506 | 506 | 516 | 504 | 517 | 542 |
| Young's modulus (GPa) | 47 | 51 | 51 | 51 | 49 | 51 | 54 |
| Specific elastic modulus | 22 | 23 | 23 | 23 | 23 | 23 | 25 |
| Temperature $T_2$ (° C.) | 1681 | 1653 | — | 1681 | (1739) | (1764) | (1701) |
| Temperature $T_4$ (° C.) | 1223 | 1220 | — | 1247 | (1282) | (1303) | (1272) |
| Relative permittivity@10 GHz | 4.0 | 4.1 | 4.0 | 4.0 | 3.8 | 3.9 | 4.1 |

TABLE 2-continued

| mol % | Example 8 | Example 9 | Example 10 | Example 11 | Example 12 | Example 13 | Example 14 |
|---|---|---|---|---|---|---|---|
| Relative permittivity@35 GHz | (4.0) | (4.1) | (4.0) | (4.1) | (3.9) | (4.0) | (4.2) |
| Dielectric loss tangent@10 GHz | 0.0010 | 0.0012 | 0.0010 | 0.0011 | 0.0008 | 0.0010 | 0.0014 |
| Dielectric loss tangent@35 GHz | (0.0014) | (0.0016) | (0.0014) | (0.0016) | (0.0012) | (0.0014) | (0.0020) |
| tanδ100-tanδ10 | (0.00023) | (0.00028) | (0.00023) | (0.00026) | (0.00020) | (0.00021) | (0.00030) |
| Surface devitrification temperature (° C.) | <1220 | <1220 | <1220 | <1250 | <1250 | <1250 | (More than 1300 and 1350 or less) |
| 6% $HNO_3$ + 5% $H_2SO_4$@45° C. × 170 sec (mg/cm$^2$) | 0.018 | 0.016 | 0.004 | 0.015 | 0.011 | 0.014 | 0.015 |
| Haze evaluation | A | A | A | A | A | A | A |
| β-OH value (mm$^{-1}$) | 0.30 | 0.40 | 0.45 | 0.50 | 0.32 | 0.35 | 0.57 |

TABLE 3

| mol % | Example 16 | Example 17 | Example 18 | Example 19 | Example 20 | Example 21 |
|---|---|---|---|---|---|---|
| $SiO_2$ | 61.3 | 61.8 | 61.8 | 61.8 | 66.1 | 62.3 |
| $Al_2O_3$ | 5.0 | 4.0 | 4.0 | 4.0 | 11.3 | 2.0 |
| $B_2O_3$ | 28.0 | 30.0 | 30.0 | 30.0 | 7.8 | 35.7 |
| MgO | 3.5 | 0.0 | 0.0 | 0.0 | 5.1 | 0.0 |
| CaO | 1.0 | 3.2 | 0.0 | 0.2 | 4.5 | 0.0 |
| SrO | 1.0 | 0.8 | 4.0 | 0.8 | 5.2 | 0.0 |
| BaO | 0.2 | 0.2 | 0.2 | 3.2 | 0.0 | 0.0 |
| $Li_2O$ | 0.20 | 0.01 | 0.00 | 0.15 | 0.00 | 0.00 |
| $Na_2O$ | 0.02 | 0.02 | 0.04 | 0.05 | 0.02 | 0.02 |
| $K_2O$ | 0.00 | 0.02 | 0.00 | 0.00 | 0.00 | 0.00 |
| $Fe_2O_3$ | 0.00 | 0.00 | 0.00 | 0.00 | 0.00 | 0.00 |
| total | 100.0 | 100.0 | 100.0 | 100.0 | 100.0 | 100.0 |
| [$Li_2O$] + [$Na_2O$] + [$K_2O$] | 0.22 | 0.05 | 0.04 | 0.20 | 0.02 | 0.02 |
| Formula (A) | 5.7 | 4.2 | 4.2 | 4.2 | 14.8 | 0.0 |
| Formula (B) | −0.7 | −0.2 | −0.2 | −0.2 | −3.6 | 2.0 |
| Formula (C) | 89.3 | 91.8 | 91.8 | 91.8 | 73.9 | 98.0 |
| Formula (D) | 0.18 | 0.13 | 0.13 | 0.13 | 1.45 | 0.06 |
| Formula (E) | 0.61 | 0.00 | 0.00 | 0.00 | 0.35 | — |
| Formula (F) | 1.14 | 1.05 | 1.05 | 1.05 | 1.32 | 0.00 |
| Formula (G) | 0.91 | 0.20 | 0.00 | 0.75 | 0.00 | 0.00 |
| Formula (H) | 0.06 | — | — | — | 0.00 | — |
| Formula (I) | 33 | 32 | 32 | 32 | 58 | 27 |
| Formula (J) | 0.27 | 0.31 | — | 20.00 | 0.54 | — |
| Average coefficient of thermal expansion (×10$^{-7}$/° C.) | 31.4 | 32.4 | 33.4 | 34.1 | 38.4 | (28.2) |
| Density (g/cm$^3$) | 2.20 | 2.17 | 2.22 | 2.27 | 2.50 | 2.06 |
| Tg (° C.) | 510 | 496 | 489 | 483 | 710 | 537 |
| Young's modulus (GPa) | 52 | 48 | 48 | 46 | 76 | 40 |
| Specific elastic modulus | 24 | 22 | 21 | 20 | 30 | 19 |
| Temperature $T_2$ (° C.) | (1652) | (1681) | (1685) | (1718) | 1645 | 1720 |
| Temperature $T_4$ (° C.) | (1226) | (1232) | (1231) | (1245) | 1275 | 1256 |
| Relative permittivity@10 GHz | 4.1 | 4.1 | 4.2 | 4.3 | 5.4 | 3.7 |
| Relative permittivity@35 GHz | (4.1) | (4.1) | (4.2) | (4.3) | 5.3 | (3.7) |
| Dielectric loss tangent@10 GHz | 0.0014 | 0.0010 | 0.0011 | 0.0014 | 0.0056 | 0.0007 |
| Dielectric loss tangent@35 GHz | (0.0020) | (0.0014) | (0.0015) | (0.0020) | 0.0070 | (0.0010) |
| tanδ100-tanδ10 | (0.00029) | (0.00023) | (0.00023) | (0.00023) | (0.00069) | (0.00007) |
| Surface devitrification temperature (° C.) | (More than 1300 and 1350 or less) | <1220 | <1220 | <1220 | <1266 | >1400 |

TABLE 3-continued

| mol % | Example 16 | Example 17 | Example 18 | Example 19 | Example 20 | Example 21 |
|---|---|---|---|---|---|---|
| 6% $HNO_3$ + 5% $H_2SO_4$@45° C. × 170 sec (mg/cm$^2$) | 0.009 | 0.058 | 0.109 | 0.132 | 0.000 | 2.050 |
| Haze evaluation | A | A | A | A | A | A |
| β-OH value (mm$^{-1}$) | 0.29 | 0.65 | 0.32 | 0.47 | 0.3 | 0.34 |

TABLE 4

| mol % | Example 22 | Example 23 | Example 24 | Example 25 | Example 26 | Example 27 | Example 28 |
|---|---|---|---|---|---|---|---|
| $SiO_2$ | 71.9 | 64.4 | 60.0 | 60.0 | 60.0 | 60.0 | 59.8 |
| $Al_2O_3$ | 5.1 | 3.5 | 5.0 | 2.0 | 0.0 | 0.0 | 4.0 |
| $B_2O_3$ | 23.1 | 32.0 | 28.0 | 31.0 | 33.0 | 36.0 | 30.0 |
| MgO | 0.0 | 0.0 | 2.0 | 2.0 | 2.0 | 1.0 | 3.2 |
| CaO | 0.0 | 0.0 | 3.0 | 3.0 | 3.0 | 2.0 | 2.0 |
| SrO | 0.0 | 0.0 | 2.0 | 2.0 | 2.0 | 1.0 | 0.8 |
| BaO | 0.0 | 0.0 | 0.0 | 0.0 | 0.0 | 0.0 | 0.2 |
| $Li_2O$ | 0.00 | 0.00 | 0.00 | 0.00 | 0.00 | 0.00 | 0.00 |
| $Na_2O$ | 0.01 | 0.02 | 0.03 | 0.02 | 0.02 | 0.02 | 0.02 |
| $K_2O$ | 0.00 | 0.00 | 0.00 | 0.00 | 0.00 | 0.00 | 0.00 |
| $Fe_2O_3$ | 0.00 | 0.00 | 0.00 | 0.00 | 0.00 | 0.00 | 0.00 |
| total | 100.0 | 100.0 | 100.0 | 100.0 | 100.0 | 100.0 | 100.0 |
| [$Li_2O$] + [$Na_2O$] + [$K_2O$] | 0.01 | 0.02 | 0.03 | 0.02 | 0.02 | 0.02 | 0.02 |
| Formula (A) | 0.0 | 0.0 | 7.0 | 7.0 | 7.0 | 4.0 | 6.2 |
| Formula (B) | 5.1 | 3.5 | −2.0 | −5.0 | −7.0 | −4.0 | −2.2 |
| Formula (C) | 95.0 | 96.5 | 88.0 | 91.0 | 93.0 | 96.0 | 89.8 |
| Formula (D) | 0.22 | 0.11 | 0.18 | 0.06 | 0.00 | 0.00 | 0.13 |
| Formula (E) | — | — | 0.29 | 0.29 | 0.29 | 0.25 | 0.52 |
| Formula (F) | 0.00 | 0.00 | 1.40 | 3.50 | — | — | 1.55 |
| Formula (G) | 0.00 | 0.00 | 0.00 | 0.00 | 0.00 | 0.00 | 0.00 |
| Formula (H) | — | — | 0.00 | 0.00 | 0.00 | 0.00 | 0.06 |
| Formula (I) | 49 | 32 | 32 | 29 | 27 | 24 | 30 |
| Formula (J) | — | — | 0.40 | 0.40 | 0.40 | 0.33 | 0.19 |
| Average coefficient of thermal expansion (×10$^{-7}$/° C.) | 24.0 | 27.0 | 32.0 | 34.5 | 35.4 | 36.0 | 33.3 |
| Density (g/cm$^3$) | 2.15 | 2.09 | 2.26 | 2.23 | 2.19 | 2.17 | 2.11 |
| Tg (° C.) | 648 | 571 | 633 | 543 | 520 | 510 | 563 |
| Young's modulus (GPa) | 52 | 44 | 53 | 47 | 44 | 40 | 50 |
| Specific elastic modulus | 24 | 21 | 23 | 21 | 20 | 18 | 24 |
| Temperature $T_2$ (° C.) | 1873 | 1750 | 1642 | — | — | — | 1629 |
| Temperature $T_4$ (° C.) | 1415 | 1295 | 1208 | — | — | — | 1197 |
| Relative permittivity@10 GHz | 3.8 | 3.8 | 4.3 | 4.0 | 3.9 | 3.8 | 4.1 |
| Relative permittivity@35 GHz | (3.8) | (3.8) | 4.3 | 4.0 | 3.9 | 3.8 | 4.1 |
| Dielectric loss tangent@10 GHz | 0.0006 | 0.0006 | 0.0016 | 0.0013 | 0.0016 | 0.0017 | 0.0013 |
| Dielectric loss tangent@35 GHz | (0.0008) | (0.0008) | 0.0022 | 0.0018 | 0.0022 | 0.0024 | 0.0019 |
| tanδ100-tanδ10 | (0.00015) | (0.00011) | (0.00033) | (0.00025) | (0.00020) | (0.00012) | (0.00028) |
| Surface devitrification temperature (° C.) | >1400 | >1400 | — | — | — | — | — |
| 6% $HNO_3$ + 5% $H_2SO_4$@45° C. × 170 sec (mg/cm$^2$) | 0.056 | 1.550 | 0.086 | 0.128 | 0.157 | 0.132 | 0.025 |
| Haze evaluation | C | C | B | C | C | C | C |
| β-OH value (mm$^{-1}$) | 0.48 | 0.44 | 0.44 | 0.2 | 0.3 | 0.46 | 0.43 |

TABLE 5

| mol % | Example 29 | Example 30 | Example 31 | Example 32 | Example 33 | Example 34 | Example 35 |
| --- | --- | --- | --- | --- | --- | --- | --- |
| $SiO_2$ | 61.8 | 62.2 | 61.8 | 61.8 | 61.8 | 62.0 | 63.1 |
| $Al_2O_3$ | 4.0 | 4.0 | 4.0 | 4.0 | 4.0 | 3.0 | 4.3 |
| $B_2O_3$ | 30.0 | 29.0 | 30.0 | 30.0 | 30.0 | 30.0 | 28.5 |
| MgO | 2.0 | 3.2 | 3.2 | 3.2 | 3.2 | 2.8 | 3.1 |
| CaO | 1.2 | 0.4 | 0.2 | 0.2 | 0.2 | 1.0 | 0.2 |
| SrO | 0.8 | 1.0 | 0.6 | 0.6 | 0.6 | 1.0 | 0.6 |
| BaO | 0.2 | 0.2 | 0.2 | 0.2 | 0.2 | 0.2 | 0.2 |
| $Li_2O$ | 0.20 | 0.10 | 0.50 | 0.36 | 1.00 | 0.10 | 0.30 |
| $Na_2O$ | 0.03 | 0.03 | 0.03 | 0.03 | 0.03 | 0.02 | 0.03 |
| $K_2O$ | 0.00 | 0.00 | 0.00 | 0.00 | 0.00 | 0.00 | 0.01 |
| $Fe_2O_3$ | 0.00 | 0.00 | 0.00 | 0.00 | 0.00 | 0.00 | 0.00 |
| total | 100.0 | 100.0 | 100.0 | 100.0 | 100.0 | 100.0 | 100.0 |
| $[Li_2O] + [Na_2O] + [K_2O]$ | 0.23 | 0.13 | 0.53 | 0.39 | 1.03 | 0.12 | 0.34 |
| Formula (A) | 4.2 | 4.8 | 4.2 | 4.2 | 4.2 | 5.0 | 4.1 |
| Formula (B) | −0.2 | −0.8 | −0.2 | −0.2 | −0.2 | −2.0 | 0.2 |
| Formula (C) | 91.8 | 91.2 | 91.8 | 91.8 | 91.8 | 92.0 | 91.6 |
| Formula (D) | 0.13 | 0.14 | 0.13 | 0.13 | 0.13 | 0.10 | 0.15 |
| Formula (E) | 0.48 | 0.67 | 0.76 | 0.76 | 0.76 | 0.56 | 0.76 |
| Formula (F) | 1.05 | 1.20 | 1.05 | 1.05 | 1.05 | 1.67 | 0.95 |
| Formula (G) | 0.87 | 0.77 | 0.94 | 0.92 | 0.97 | 0.83 | 0.88 |
| Formula (H) | 0.10 | 0.06 | 0.06 | 0.06 | 0.06 | 0.07 | 0.06 |
| Formula (I) | 32 | 33 | 32 | 32 | 32 | 32 | 35 |
| Formula (J) | 0.31 | 0.33 | 0.24 | 0.24 | 0.24 | 0.32 | 0.24 |
| Average coefficient of thermal expansion ($\times 10^{-7}$/° C.) | (32.2) | (31.8) | (31.2) | (31.2) | (31.2) | (32.9) | (30.5) |
| Density (g/cm$^3$) | (2.16) | (2.17) | (2.16) | (2.16) | (2.16) | (2.17) | (2.16) |
| Tg (° C.) | (559) | (566) | (561) | (561) | (561) | (553) | (573) |
| Young's modulus (GPa) | (49) | (50) | (49) | (49) | (49) | (49) | (50) |
| Specific elastic modulus | (23) | (23) | (23) | (23) | (23) | (22) | (23) |
| Temperature $T_2$ (° C.) | (1678) | (1680) | (1675) | (1675) | (1675) | (1681) | (1699) |
| Temperature $T_4$ (° C.) | (1234) | (1238) | (1235) | (1235) | (1235) | (1230) | (1256) |
| Relative permittivity@10 GHz | (3.9) | (3.9) | (3.9) | (3.9) | (3.9) | (3.9) | (3.9) |
| Relative permittivity@35 GHz | (4.0) | (4.0) | (3.9) | (3.9) | (3.9) | (3.9) | (3.9) |
| Dielectric loss tangent@10 GHz | (0.0009) | (0.0011) | (0.0009) | (0.0009) | (0.0010) | (0.0010) | (0.0010) |
| Dielectric loss tangent@35 GHz | (0.0013) | (0.0015) | (0.0013) | (0.0013) | (0.0015) | (0.0014) | (0.0014) |
| tanδ100-tanδ10 | (0.00023) | (0.00025) | (0.00023) | (0.00023) | (0.00023) | (0.00022) | (0.00024) |
| Surface devitrification temperature (° C.) | <1200 | <1200 | <1200 | <1200 | <1200 | <1200 | <1200 |
| 6% $HNO_3$ + 5% $H_2SO_4$@45° C. × 170 sec (mg/cm$^2$) | (0.050) | (0.048) | (0.046) | (0.046) | (0.046) | (0.063) | (0.037) |
| Haze evaluation | A | A | A | A | A | A | A |
| β-OH value (mm$^{-1}$) | 0.60 | 0.80 | 0.60 | 0.60 | 0.60 | 0.60 | 0.60 |

TABLE 6

| mol % | Example 36 | Example 37 | Example 39 | Example 40 |
| --- | --- | --- | --- | --- |
| $SiO_2$ | 61.5 | 61.5 | 61.0 | 61.8 |
| $Al_2O_3$ | 3.8 | 3.8 | 3.0 | 4.0 |
| $B_2O_3$ | 30.0 | 30.0 | 30.0 | 30.0 |
| MgO | 1.0 | 1.0 | 1.0 | 1.0 |
| CaO | 3.5 | 0.2 | 2.0 | 1.2 |
| SrO | 0.2 | 3.3 | 2.0 | 0.8 |
| BaO | 0.0 | 0.2 | 0.0 | 0.2 |
| $Li_2O$ | 0.30 | 0.30 | 0.20 | 0.35 |
| $Na_2O$ | 0.03 | 0.03 | 0.03 | 0.03 |
| $K_2O$ | 0.01 | 0.01 | 0.01 | 0.00 |
| $Fe_2O_3$ | 0.00 | 0.00 | 0.00 | 0.00 |
| total | 100.0 | 100.0 | 100.0 | 100.0 |
| $[Li_2O] + [Na_2O] + [K_2O]$ | 0.34 | 0.34 | 0.24 | 0.38 |
| Formula (A) | 4.7 | 4.7 | 6.0 | 4.2 |
| Formula (B) | −0.9 | −0.9 | −3.0 | −0.2 |
| Formula (C) | 91.5 | 91.5 | 91.0 | 91.8 |
| Formula (D) | 0.13 | 0.13 | 0.10 | 0.13 |
| Formula (E) | 0.21 | 0.21 | 0.33 | 0.48 |

TABLE 6-continued

| mol % | Example 36 | Example 37 | Example 39 | Example 40 |
|---|---|---|---|---|
| Formula (F) | 1.24 | 1.24 | 2.00 | 1.05 |
| Formula (G) | 0.88 | 0.88 | 0.83 | 0.92 |
| Formula (H) | 0.00 | 0.20 | 0.00 | 0.10 |
| Formula (I) | 32 | 32 | 31 | 32 |
| Formula (J) | 0.04 | 2.92 | 0.50 | 0.31 |
| Average coefficient of thermal expansion ($\times 10^{-7}/°$ C.) | (33.6) | (34.0) | (35.1) | (32.2) |
| Density (g/cm$^3$) | (2.16) | (2.21) | (2.19) | (2.16) |
| Tg (° C.) | (577) | (554) | (550) | (559) |
| Young's modulus (GPa) | (49) | (49) | (49) | (49) |
| Specific elastic modulus | (23) | (22) | (23) | (23) |
| Temperature $T_2$ (° C.) | (1674) | (1673) | (1658) | (1678) |
| Temperature $T_4$ (° C.) | (1227) | (1224) | (1208) | (1234) |
| Relative permittivity@10 GHz | (4.0) | (4.0) | (4.0) | (3.9) |
| Relative permittivity@35 GHz | (4.0) | (4.1) | (4.1) | (4.0) |
| Dielectric loss tangent@10 GHz | (0.0010) | (0.0012) | (0.0013) | (0.0009) |
| Dielectric loss tangent@35 GHz | (0.0014) | (0.0017) | (0.0018) | (0.0014) |
| tanδ100 − tanδ10 | (0.00024) | (0.00024) | (0.00025) | (0.00023) |
| Surface devitrification temperature (° C.) | <1200 | <1200 | <1200 | <1200 |
| 6% HNO$_3$ + 5% H$_2$SO$_4$@45° C. × 170 sec (mg/cm$^2$) | (0.063) | (0.054) | (0.075) | (0.050) |
| Haze evaluation | A | A | A | A |
| β-OH value (mm$^{-1}$) | 0.60 | 0.60 | 0.60 | 0.60 |

TABLE 7

| mol % | Example 41 | Example 42 | Example 43 | Example 44 | Example 45 | Example 46 | Example 47 |
|---|---|---|---|---|---|---|---|
| SiO$_2$ | 61.8 | 61.8 | 61.8 | 61.8 | 61.8 | 61.8 | 66.1 |
| Al$_2$O$_3$ | 4.0 | 4.0 | 4.0 | 4.0 | 4.0 | 4.0 | 11.3 |
| B$_2$O$_3$ | 30.0 | 30.0 | 30.0 | 30.0 | 30.0 | 30.0 | 7.8 |
| MgO | 3.2 | 3.2 | 3.2 | 2.0 | 2.0 | 2.0 | 5.1 |
| CaO | 0.2 | 0.2 | 0.2 | 1.2 | 1.2 | 1.2 | 4.5 |
| SrO | 0.6 | 0.6 | 0.6 | 0.8 | 0.8 | 0.8 | 5.2 |
| BaO | 0.2 | 0.2 | 0.2 | 0.2 | 0.2 | 0.2 | 0.0 |
| Li$_2$O | 0.36 | 0.36 | 0.36 | 0.35 | 0.35 | 0.35 | 0.00 |
| Na$_2$O | 0.03 | 0.03 | 0.03 | 0.03 | 0.03 | 0.03 | 0.02 |
| K$_2$O | 0.00 | 0.00 | 0.00 | 0.00 | 0.00 | 0.00 | 0.00 |
| Fe$_2$O$_3$ | 0.00 | 0.00 | 0.00 | 0.00 | 0.00 | 0.00 | 0.00 |
| total | 100.0 | 100.0 | 100.0 | 100.0 | 100.0 | 100.0 | 100.0 |
| [Li$_2$O] + [Na$_2$O] + [K$_2$O] | 0.39 | 0.39 | 0.39 | 0.38 | 0.38 | 0.38 | 0.02 |
| Formula (A) | 4.2 | 4.2 | 4.2 | 4.2 | 4.2 | 4.2 | 14.8 |
| Formula (B) | −0.2 | −0.2 | −0.2 | −0.2 | −0.2 | −0.2 | −3.6 |
| Formula (C) | 91.8 | 91.8 | 91.8 | 91.8 | 91.8 | 91.8 | 73.9 |
| Formula (D) | 0.13 | 0.13 | 0.13 | 0.13 | 0.13 | 0.13 | 1.45 |
| Formula (E) | 0.76 | 0.76 | 0.76 | 0.48 | 0.48 | 0.48 | 0.35 |
| Formula (F) | 1.05 | 1.05 | 1.05 | 1.05 | 1.05 | 1.05 | 1.32 |
| Formula (G) | 0.92 | 0.92 | 0.92 | 0.92 | 0.92 | 0.92 | 0.00 |
| Formula (H) | 0.06 | 0.06 | 0.06 | 0.10 | 0.10 | 0.10 | 0.00 |
| Formula (I) | 32 | 32 | 32 | 32 | 32 | 32 | 58 |
| Formula (J) | 0.24 | 0.24 | 0.24 | 0.31 | 0.31 | 0.31 | 0.54 |
| β-OH value (mm$^{-1}$) | 0.30 | 0.34 | 0.55 | 0.45 | 0.20 | 0.60 | 0.50 |
| Equivalent cooling rate based on tanδ (° C./min) | 40 | 100 | 500 | 40 | 100 | 500 | 40 |
| tanδA | 0.00127 | 0.00136 | 0.00152 | 0.00129 | 0.00138 | 0.00154 | 0.00634 |
| tanδ100-tanδA | 0.00009 | 0.00000 | −0.00016 | 0.00009 | 0.00000 | −0.00016 | 0.00027 |

TABLE 8

| mol % | Example 48 | Example 49 |
|---|---|---|
| SiO$_2$ | 66.1 | 66.1 |
| Al$_2$O$_3$ | 11.3 | 11.3 |
| B$_2$O$_3$ | 7.8 | 7.8 |
| MgO | 5.1 | 5.1 |
| CaO | 4.5 | 4.5 |
| SrO | 5.2 | 5.2 |
| BaO | 0.0 | 0.0 |
| Li$_2$O | 0.00 | 0.00 |
| Na$_2$O | 0.02 | 0.02 |
| K$_2$O | 0.00 | 0.00 |
| Fe$_2$O$_3$ | 0.00 | 0.00 |
| total | 100.0 | 100.0 |
| [Li$_2$O] + [Na$_2$O] + [K$_2$O] | 0.02 | 0.02 |
| Formula (A) | 14.8 | 14.8 |
| Formula (B) | −3.6 | −3.6 |

TABLE 8-continued

| mol % | Example 48 | Example 49 |
|---|---|---|
| Formula (C) | 73.9 | 73.9 |
| Formula (D) | 1.45 | 1.45 |
| Formula (E) | 0.35 | 0.35 |
| Formula (F) | 1.32 | 1.32 |
| Formula (G) | 0.00 | 0.00 |
| Formula (H) | 0.00 | 0.00 |
| Formula (I) | 58 | 58 |
| Formula (J) | 0.54 | 0.54 |
| β-OH value (mm$^{-1}$) | 0.60 | 0.60 |
| Equivalent cooling rate based on tanδ (° C./min) | 100 | 500 |
| tanδA | 0.00661 | 0.00709 |
| tanδ100 − tanδA | 0.00000 | −0.00048 |

TABLE 9

| mol % | Example 50 | Example 51 | Example 52 | Example 53 | Example 54 | Example 55 | Example 56 |
|---|---|---|---|---|---|---|---|
| SiO$_2$ | 60.7 | 60.9 | 60.8 | 61.0 | 61.2 | 61.1 | 61.3 |
| Al$_2$O$_3$ | 4.2 | 3.6 | 4.3 | 4.1 | 4.1 | 4.8 | 5.5 |
| B$_2$O$_3$ | 29.4 | 29.3 | 29.1 | 29.0 | 28.8 | 28.5 | 28.5 |
| MgO | 3.4 | 4.1 | 3.4 | 4.0 | 4.0 | 3.7 | 3.1 |
| CaO | 1.0 | 0.6 | 1.1 | 0.9 | 1.1 | 1.2 | 0.9 |
| SrO | 0.8 | 1.0 | 0.8 | 0.8 | 0.8 | 0.7 | 0.7 |
| BaO | 0.2 | 0.2 | 0.2 | 0.2 | 0.0 | 0.0 | 0.0 |
| Li$_2$O | 0.30 | 0.30 | 0.30 | 0.00 | 0.00 | 0.00 | 0.00 |
| Na$_2$O | 0.08 | 0.080 | 0.08 | 0.00 | 0.00 | 0.00 | 0.08 |
| K$_2$O | 0.00 | 0.00 | 0.00 | 0.00 | 0.00 | 0.00 | 0.00 |
| Fe$_2$O$_3$ | 0.00 | 0.00 | 0.00 | 0.00 | 0.00 | 0.00 | 0.00 |
| total | 100.0 | 100.0 | 100.0 | 100.0 | 100.0 | 100.0 | 100.0 |
| [Li$_2$O] + [Na$_2$O] + [K$_2$O] | 0.38 | 0.38 | 0.38 | 0.00 | 0.00 | 0.00 | 0.08 |
| Formula (A) | 5.4 | 5.9 | 5.5 | 5.9 | 5.9 | 5.6 | 4.7 |
| Formula (B) | −1.2 | −2.3 | −1.2 | −1.8 | −1.8 | −0.8 | 0.8 |
| Formula (C) | 90.1 | 90.2 | 89.9 | 90.0 | 90.0 | 89.6 | 89.7 |
| Formula (D) | 0.14 | 0.12 | 0.15 | 0.14 | 0.14 | 0.17 | 0.19 |
| Formula (E) | 0.63 | 0.69 | 0.62 | 0.68 | 0.68 | 0.66 | 0.66 |
| Formula (F) | 1.29 | 1.64 | 1.28 | 1.44 | 1.44 | 1.17 | 0.85 |
| Formula (G) | 0.79 | 0.79 | 0.79 | — | — | — | 0.00 |
| Formula (H) | 0.06 | 0.05 | 0.06 | 0.05 | 0.00 | 0.00 | 0.00 |
| Formula (I) | 31 | 32 | 32 | 32 | 32 | 33 | 33 |
| Formula (J) | 0.23 | 0.26 | 0.22 | 0.20 | 0.16 | 0.14 | 0.18 |
| Average coefficient of thermal expansion (×10$^{-7}$/° C.) | (32.7) | (33.0) | (32.7) | (32.8) | (32.7) | (32.2) | (31.2) |
| Density (g/cm$^3$) | (2.18) | (2.18) | (2.18) | (2.19) | (2.18) | (2.18) | (2.18) |
| Tg (° C.) | (543) | (540) | (545) | (565) | (567) | (573) | (578) |
| Young's modulus (GPa) | (50) | (51) | (51) | (51) | (51) | (52) | (52) |
| Specific elastic modulus | (23) | (23) | (23) | (23) | (24) | (24) | (24) |
| Temperature T$_2$ (° C.) | (1650) | (1653) | (1651) | (1648) | (1652) | (1649) | (1655) |
| Temperature T$_4$ (° C.) | (1216) | (1214) | (1218) | (1215) | (1218) | (1221) | (1231) |
| Relative permittivity@10 GHz | (4.0) | (4.0) | (4.0) | (4.0) | (4.0) | (4.0) | (4.0) |
| Relative permittivity@35 GHz | (4.0) | (4.0) | (4.0) | (4.0) | (4.0) | (4.0) | (4.0) |
| Dielectric loss tangent@10 GHz | (0.0012) | (0.0013) | (0.0013) | (0.0013) | (0.0013) | (0.0013) | (0.0011) |
| Dielectric loss tangent@35 GHz | (0.0017) | (0.0018) | (0.0018) | (0.0018) | (0.0018) | (0.0018) | (0.0016) |
| tanδ100-tanδ10 | (0.00027) | (0.00026) | (0.00027) | (0.00028) | (0.00028) | (0.00029) | (0.00028) |
| Surface devitrification temperature (° C.) | (<1200) | (<1200) | (<1200) | (<1200) | (<1200) | <1200 | (<1200) |
| 6% HNO$_3$ + 5% H$_2$SO$_4$@45° C. × 170 sec (mg/cm$^2$) | (0.016) | (0.015) | (0.016) | (0.011) | (0.006) | (0.005) | (0.007) |
| Haze evaluation | (A) | (A) | (A) | (A) | (A) | (A) | (A) |
| β-OH value (mm$^{-1}$) | 0.50 | 0.50 | 0.50 | 0.50 | 0.50 | 0.50 | 0.50 |

TABLE 10

| mol % | Example 57 | Example 58 |
|---|---|---|
| $SiO_2$ | 61.8 | 61.3 |
| $Al_2O_3$ | 4.8 | 4.2 |
| $B_2O_3$ | 28.0 | 29.9 |
| MgO | 3.6 | 1.0 |
| CaO | 0.9 | 0.5 |
| SrO | 0.7 | 0.8 |
| BaO | 0.1 | 2.0 |
| $Li_2O$ | 0.05 | 0.30 |
| $Na_2O$ | 0.03 | 0.03 |
| $K_2O$ | 0.00 | 0.01 |
| $Fe_2O_3$ | 0.00 | 0.00 |
| total | 100.0 | 100.0 |
| $[Li_2O] + [Na_2O] + [K_2O]$ | 0.08 | 0.34 |
| Formula (A) | 5.3 | 4.3 |
| Formula (B) | −0.5 | −0.1 |
| Formula (C) | 89.8 | 91.2 |
| Formula (D) | 0.17 | 0.14 |
| Formula (E) | 0.68 | 0.23 |
| Formula (F) | 1.10 | 1.02 |
| Formula (G) | 0.63 | 0.88 |
| Formula (H) | 0.03 | 2.00 |
| Formula (I) | 34 | 31 |
| Formula (J) | 0.18 | 1.87 |
| Average coefficient of thermal expansion ($\times 10^{-7}$/° C.) | (31.7) | (33.8) |
| Density (g/cm$^3$) | (2.18) | (2.23) |
| Tg (° C.) | (577) | (553) |
| Young's modulus (GPa) | (52) | (48) |
| Specific elastic modulus | (24) | (22) |
| Temperature $T_2$ (° C.) | (1665) | (1677) |
| Temperature $T_4$ (° C.) | (1234) | (1234) |
| Relative permittivity@10 GHz | (4.0) | (4.1) |
| Relative permittivity@35 GHz | (4.0) | (4.1) |
| Dielectric loss tangent@10 GHz | (0.0012) | (0.0011) |
| Dielectric loss tangent@35 GHz | (0.0018) | (0.0016) |
| tanδ100 − tanδ10 | (0.00029) | (0.00024) |
| Surface devitrification temperature (° C.) | (<1200) | (<1200) |
| 6% $HNO_3$ + 5% $H_2SO_4$@45° C. × 170 sec (mg/cm$^2$) | (0.007) | (0.085) |
| Haze evaluation | (A) | (A) |
| β-OH value (mm$^{-1}$) | 0.50 | 0.50 |

TABLE 11

| mol % | Example 59 | Example 60 | Example 61 | Example 62 | Example 63 | Example 64 |
|---|---|---|---|---|---|---|
| $SiO_2$ | 60.8 | 60.7 | 61.0 | 60.9 | 60.9 | 60.8 |
| $Al_2O_3$ | 4.1 | 4.1 | 4.1 | 4.1 | 4.8 | 4.8 |
| $B_2O_3$ | 28.9 | 28.8 | 28.7 | 28.6 | 28.4 | 28.3 |
| MgO | 4.0 | 4.0 | 4.0 | 4.0 | 3.7 | 3.7 |
| CaO | 0.9 | 0.9 | 1.1 | 1.1 | 1.2 | 1.2 |
| SrO | 0.8 | 0.8 | 0.8 | 0.8 | 0.7 | 0.7 |
| BaO | 0.2 | 0.2 | 0.0 | 0.0 | 0.0 | 0.0 |
| $Li_2O$ | 0.30 | 0.30 | 0.30 | 0.30 | 0.30 | 0.30 |
| $Na_2O$ | 0.08 | 0.080 | 0.08 | 0.08 | 0.08 | 0.08 |
| $K_2O$ | 0.00 | 0.00 | 0.00 | 0.00 | 0.00 | 0.00 |
| $Fe_2O_3$ | 0.00 | 0.00 | 0.00 | 0.00 | 0.00 | 0.00 |
| F | 0.00 | 0.16 | 0.00 | 0.16 | 0.00 | 0.16 |
| total | 100.0 | 100.0 | 100.0 | 100.0 | 100.0 | 100.0 |
| $[Li_2O] + [Na_2O] + [K_2O]$ | 0.38 | 0.38 | 0.38 | 0.38 | 0.38 | 0.38 |
| Formula (A) | 5.9 | 5.9 | 5.9 | 5.9 | 5.6 | 5.6 |
| Formula (B) | −1.8 | −1.8 | −1.8 | −1.8 | −1.8 | −1.8 |
| Formula (C) | 89.7 | 89.5 | 89.7 | 89.5 | 89.3 | 89.1 |
| Formula (D) | 0.14 | 0.14 | 0.14 | 0.14 | 0.17 | 0.17 |
| Formula (E) | 0.68 | 0.68 | 0.68 | 0.68 | 0.66 | 0.66 |
| Formula (F) | 1.44 | 1.44 | 1.44 | 1.44 | 1.17 | 1.17 |
| Formula (G) | 0.79 | 0.79 | 0.79 | 0.79 | 0.79 | 0.79 |
| Formula (H) | 0.05 | 0.05 | 0.00 | 0.00 | 0.00 | 0.00 |
| Formula (I) | 32 | 32 | 32 | 32 | 32 | 32 |
| Formula (J) | 0.20 | 0.20 | 0.16 | 0.16 | 0.14 | 0.14 |
| Average coefficient of thermal expansion ($\times 10^{-7}$/° C.) | (32.8) | (32.8) | (32.7) | (32.7) | (32.2) | (32.2) |
| Density (g/cm$^3$) | (2.19) | (2.19) | (2.18) | (2.18) | (2.18) | (2.18) |
| Tg (° C.) | (545) | (542) | (547) | (544) | (553) | (550) |
| Young's modulus (GPa) | (51) | (51) | (51) | (51) | (52) | (52) |
| Specific elastic modulus | (23) | (23) | (24) | (24) | (24) | (24) |
| Temperature $T_2$ (° C.) | (1648) | (1648) | (1652) | (1652) | (1649) | (1649) |
| Temperature $T_4$ (° C.) | (1215) | (1215) | (1218) | (1218) | (1221) | (1221) |
| Relative permittivity@10 GHz | (4.0) | (4.0) | (4.0) | (4.0) | (4.0) | (4.0) |
| Relative permittivity@35 GHz | (4.0) | (4.0) | (4.0) | (4.0) | (4.0) | (4.0) |
| Dielectric loss tangent@10 GHz | (0.00136) | (0.00129) | (0.00135) | (0.00128) | (0.00133) | (0.00126) |

TABLE 11-continued

| mol % | Example 59 | Example 60 | Example 61 | Example 62 | Example 63 | Example 64 |
|---|---|---|---|---|---|---|
| Dielectric loss tangent@35 GHz | (0.00191) | (0.00184) | (0.00189) | (0.00182) | (0.00190) | (0.00183) |
| tanδ100-tanδ10 | (0.00028) | (0.00028) | (0.00028) | (0.00028) | (0.00029) | (0.00029) |
| Surface devitrification temperature (° C.) | (<1200) | (<1200) | (<1200) | (<1200) | <1200 | <1200 |
| 6% $HNO_3$ + 5% $H_2SO_4$@45° C. × 170 sec (mg/cm$^2$) | (0.011) | (0.011) | (0.006) | (0.006) | (0.005) | (0.005) |
| Haze evaluation | (A) | (A) | (A) | (A) | (A) | (A) |
| β-OH value (mm$^{-1}$) | 0.50 | 0.50 | 0.50 | 0.50 | 0.50 | 0.50 |

In Examples 1 to 14, Example 16, Examples 29 to 37, Examples 39 and 40, and Examples 50 to 64 in which the value of the formula (A) was 2% or more and 6% or less, the dielectric loss tangent at 35 GHz was 0.005 or less, the surface devitrification temperature was 1400° C. or lower, the elution amount of the glass component in the acid resistance evaluation was 0.02 mg/cm$^2$ or less, and the haze evaluation was A. In Examples 41 to 46 in which the value of the formula (A) is 2% or more and 6% or less, it is estimated that the dielectric loss tangent at 35 GHz is 0.005 or less, the surface devitrification temperature is 1400° C. or lower, the elution amount of the glass component in the acid resistance evaluation is 0.02 mg/cm$^2$ or less, and the haze evaluation is A.

In Examples 24 and 28 in which the value of the formula (A) was more than 6%, the haze evaluation was B or C.

In Example 21 in which the content of $B_2O_3$ was more than 35%, the content of MgO was less than 1%, and the value of the formula (A) was less than 2%, the surface devitrification temperature was more than 1400° C., and the elution amount of the glass component in the acid resistance evaluation was more than 0.02 mg/cm$^2$.

In Examples 1 to 16, Examples 29 to 37, Examples 39 and 40, and Examples 50 to 63 in which the value of the formula (B) was -3% or more and 2% or less, the surface devitrification temperature was 1400° C. or lower, the elution amount of the glass component in the acid resistance evaluation was 0.02 mg/cm$^2$ or less, and the haze evaluation was A.

In Example 27 in which the content of $Al_2O_3$ was less than 2%, the content of $B_2O_3$ was more than 35%, and the value of the formula (B) was less than -3%, the elution amount of the glass component in the acid resistance evaluation was more than 0.02 mg/cm$^2$, and the haze evaluation was C.

In Example 23 in which the content of MgO was less than 1%, the value of the formula (A) was less than 2%, and the value of the formula (B) was more than 2%, the surface devitrification temperature was more than 1400° C., the elution amount of the glass component in the acid resistance evaluation was more than 0.02 mg/cm$^2$, and the haze evaluation was C.

In Example 22 in which the content of MgO was less than 1%, the value of the formula (A) was less than 2%, and the value of the formula (B) was more than 2%, the surface devitrification temperature was more than 1400° C., the elution amount of the glass component in the acid resistance evaluation was more than 0.02 mg/cm$^2$, and the haze evaluation was C.

In Example 20 in which the content of $Al_2O_3$ was more than 6%, the content of $B_2O_3$ was less than 18%, the value of the formula (A) was more than 6%, and the value of the formula (B) was less than -3%, the dielectric loss tangent at 35 GHz was more than 0.005. In Example 25 in which the value of the formula (A) was more than 6% and the value of the formula (B) was less than -3%, the elution amount of the glass component in the acid resistance evaluation was more than 0.02 mg/cm$^2$, and the haze evaluation was C.

In Example 26 in which the content of $Al_2O_3$ was less than 2%, the value of the formula (A) was more than 6%, and the value of the formula (B) was less than -3%, the elution amount of the glass component in the acid resistance evaluation was more than 0.02 mg/cm$^2$, and the haze evaluation was C.

In Examples 17 and 18 in which the content of MgO was less than 1% and Example 19 in which the content of MgO was less than 1% and the content of BaO was more than 3%, the elution amount of the glass component in the acid resistance evaluation was more than 0.02 mg/cm$^2$.

In Examples 47 to 49 in which the content of $Al_2O_3$ is more than 6%, the content of $B_2O_3$ is less than 18%, the value of the formula (A) is more than 6%, and the value of the formula (B) is less than -3%, it is estimated that the dielectric loss tangent at 35 GHz is more than 0.005.

In Examples 1 to 14, Example 16, Examples 29 to 37, Examples 39 and 40, and Examples 50 to 64 in which the value of the formula (C) is 88% or more and 93% or less, the dielectric loss tangent and the relative permittivity at 35 GHz and 10 GHz, and the temperature $T_2$ tend to decrease. Also in Examples 41 to 46 in which the value of the formula (C) is 88% or more and 93% or less, it is estimated that the dielectric loss tangent and the relative permittivity at 35 GHz and 10 GHz, and the temperature $T_2$ tend to decrease.

In Examples 1 to 14, Example 16, Examples 29 to 37, Examples 39 and 40, and Examples 50 to 64 in which the value of the formula (D) is 0.1 or more and 0.3 or less, the elution amount of the glass component in the acid resistance evaluation tends to decrease. Also in Examples 41 to 46 in which the value of the formula (D) is 0.10 or more and 0.3 or less, it is estimated that the elution amount of the glass component in the acid resistance evaluation tends to decrease.

In Examples 1 to 10, Example 12, Example 16, Examples 30 to 35, and Examples 50 to 64 in which the value of the formula (E) is 0.5 or more, the elution amount of the glass component in the acid resistance evaluation decreases, and the haze evaluation tends to be good. Also in Examples 41 to 43 in which the value of the formula (E) is 0.5 or more, it is estimated that the elution amount of the glass component in the acid resistance evaluation decreases and the haze evaluation tends to be good.

In Examples 1 to 11, Example 14, Example 16, Examples 29 to 33, Example 35, Example 40, Examples 55 to 58, Example 63, and Example 64 in which the value of the formula (F) is 0.5 or more and 1.2 or less, the surface devitrification temperature decreases, the elution amount of the glass component in the acid resistance evaluation decreases, and the haze evaluation tends to be good. Also in Examples 41 to 46 in which the value of the formula (F) is 0.5 or more and 1.2 or less, it is estimated that the surface devitrification temperature decreases, the elution amount of the glass component in the acid resistance evaluation decreases, and the haze evaluation tends to be good.

In Examples 6 to 8, Example 10, Example 14, Example 16, Examples 29 to 37, Examples 39 and 40, Examples 50 to 52, and Examples 57 to 64 in which the value of the formula (G) is 0.5 or more, the dielectric loss tangent and the relative permittivity at 35 GHz and 10 GHz, the Tg, the temperature $T_2$, and the temperature $T_4$ tend to be low. Also in Examples 41 to 46 in which the value of the formula (G) is 0.5 or more, it is estimated that the dielectric loss tangent and the relative permittivity at 35 GHz and 10 GHz, the Tg, the temperature $T_2$, and the temperature $T_4$ tend to be low.

In Examples 1 to 9, Example 14, Example 16, Examples 29 to 35, Example 37, Example 40, Examples 50 to 53, and Examples 57 to 60 in which the value of the formula (H) is 0.01 or more and 5 or less, the elution amount of the glass component in the acid resistance evaluation decreases, and the haze evaluation tends to be good. Also in Examples 41 to 46 in which the value of the formula (H) is 0.01 or more and 5 or less, it is estimated that the elution amount of the glass component in the acid resistance evaluation decreases and the haze evaluation tends to be good.

In Examples 5 to 12, Example 14, Example 16, Examples 29 to 37, Example 39, Example 40, and Examples 50 to 64 in which the value of the formula (I) is 20% or more and 40% or less, the dielectric loss tangent and the relative permittivity at 35 GHz and 10 GHz, and the elution amount of the glass component in the acid resistance evaluation tend to be low.

Also in Examples 41 to 46 in which the value of the formula (I) is 20% or more and 40% or less, it is estimated that the dielectric loss tangent and the relative permittivity at 35 GHz and 10 GHz, and the elution amount of the glass component in the acid resistance evaluation tend to be low.

In Examples 1 to 9, Examples 11 to 14, Example 16, Examples 29 to 35, Example 39, Example 40, and Examples 50 to 64 in which the value of the formula (J) is 0.05 or more and 2 or less, the dielectric loss tangent and the relative permittivity at 35 GHz and 10 GHz, and the elution amount of the glass component in the acid resistance evaluation tend to be low. Also in Examples 41 to 46 in which the value of the formula (J) is 0.05 or more and 2 or less, it is estimated that the dielectric loss tangent and the relative permittivity at 35 GHz and 10 GHz, and the elution amount of the glass component in the acid resistance evaluation tend to be low.

In Examples 1 to 14, Example 16, Examples 29 to 37, Example 39, Example 40, and Examples 50 to 64 in which $-0.0003 \leq (\tan \delta 100 - \tan \delta 10) \leq 0.0003$ is satisfied, deterioration of the dielectric loss tangent $\tan \delta$ can be prevented even in the case of rapid cooling in glass production.

In Examples 41 to 46 in which $-0.0003 \leq (\tan \delta 100 - \tan \delta A) \leq 0.0003$ is satisfied, it is estimated that deterioration of the dielectric loss tangent $\tan \delta$ can be prevented even in the case of rapid cooling in glass production.

Although the present invention has been described in detail with reference to specific embodiments, it is apparent to those skilled in the art that various changes and modifications can be made without departing from the spirit and scope of the present invention.

The present application is based on a Japanese Patent Application No. 2020-143080 filed on Aug. 27, 2020 and a Japanese Patent Application No. 2021-009791 filed on Jan. 25, 2021, the contents of which are incorporated herein by reference.

INDUSTRIAL APPLICABILITY

The glass according to the present disclosure has a low surface devitrification temperature, is excellent in acid resistance and phase separation stability, and can reduce dielectric loss of a high-frequency signal. A glass plate containing such alkali-free glass is useful for high-frequency electronic devices in general that handle high-frequency signals exceeding 10 GHz, particularly high-frequency signals exceeding 30 GHz, and further high-frequency signals of 35 GHz or higher, for example, a glass substrate of a communication device, a frequency filter component such as a SAW device and FBAR, a band-pass filter such as a waveguide tube, a substrate integrated waveguide (SIW) component, a radar component, an antenna component (particularly, a liquid crystal antenna most suitable for satellite communication), a window glass, and a vehicle window glass.

REFERENCE SIGNS LIST

1: circuit substrate
2: glass substrate
2a, 2b: main surfaces
3, 4: wiring layer

The invention claimed is:

1. An alkali-free glass, comprising:
a glass having a composition comprising, as represented by mol % based on oxides, 50 to 75% of $SiO_2$, 2% to 6% of $Al_2O_3$, 21% to 35% of $B_2O_3$, 1% to 5.5% of MgO, 0% to 5.5% of CaO, 0% to 5.5% of SrO, 0% to 3% of BaO, and 0% to 0.4% in total of at least one selected from the group consisting of $Li_2O$, $Na_2O$, and $K_2O$,
wherein a value of [MgO]+[CaO]+[SrO]+[BaO] is 2% to 5.5%, a value of $[Al_2O_3]-([MgO]+[CaO]+[SrO]+[BaO]$ is in a range of −3% to 2%, and a value of $[Al_2O_3]/[B_2O_3]$ is from 0.13 to 0.3.

2. The alkali-free glass according to claim 1, wherein the composition of the glass further comprises Fe in terms of $Fe_2O_3$ in a range of 0 mol % to 0.5 mol %.

3. The alkali-free glass according to claim 1, wherein the composition of the glass further comprises, as represented by mol % based on oxides, $SnO_2$ in a range of 0% to 0.5%.

4. The alkali-free glass according to claim 1, wherein the composition of the glass further comprises, as represented by mol % based on oxides, at least one selected from the group consisting of $Sc_2O_3$, $TiO_2$, ZnO, $Ga_2O_3$, $GeO_2$, $Y_2O_3$, $ZrO_2$, $Nb_2O_5$, $In_2O_3$, $TeO_2$, $HfO_2$, $Ta_2O_5$, $WO_3$, $Bi_2O_3$, $La_2O_3$, $Gd_2O_3$, $Yb_2O_3$, and $Lu_2O_3$ in a range of from 0% to 1% in total.

5. The alkali-free glass according to claim 1, wherein the composition of the glass further comprises F in a range of 0 mol % to 1.5 mol %.

6. The alkali-free glass according to claim 1, wherein a value of $[SiO_2]+[B_2O_3]$ is in a range of 88% to 96%.

7. The alkali-free glass according to claim 1, wherein a value of $[SiO_2]+[B_2O_3]$ is in a range of 89.4% to 93%.

8. The alkali-free glass according to claim 1, wherein a value of [MgO]/([MgO]+[CaO]+[SrO]+[BaO] is 0.5 or more.

9. The alkali-free glass according to claim 1, wherein a value of $[MgO]+[CaO]+[SrO]+[BaO])/[Al_2O_3]$ is in a range of 0.5 to 1.2.

10. The alkali-free glass according to claim 1, wherein a value of $[Li_2O]/([Li_2O]+[NaO]+[K_2O])$ is 0.5 or more.

11. The alkali-free glass according to claim 1, wherein a β-OH value of the alkali-free glass is in a range of 0.05 mm$^{-1}$ to 1.0 mm$^{-1}$.

12. The alkali-free glass according to claim 1, wherein a dielectric loss tangent at 35 GHz of the alkali-free glass is 0.005 or less.

13. The alkali-free glass according to claim 1, wherein the alkali-free glass has a density of 2.58 g/cm$^3$ or less and an average coefficient of thermal expansion at 50° C. to 350° C. in a range of 20×10$^{-7}$/° C. to 50×10$^{-7}$/° C.

14. The alkali-free glass according to claim 1, wherein the alkali-free glass has a temperature $T_2$ at which a glass viscosity is 10$^2$ dPa·s in a range of 1500° C. to 1900° C. and a temperature $T_4$ at which the glass viscosity is 10$^4$ dPa·s in a range of 1290° C. or lower.

15. The alkali-free glass according to claim 1, wherein a glass transition temperature is 700° C. or lower.

16. The alkali-free glass according to claim 1, wherein a surface devitrification temperature is 1400° C. or lower.

17. A glass plate comprising the alkali-free glass according to claim 1, wherein the glass plate comprises main surfaces and an end surface, and at least one main surface of the main surfaces has an arithmetic mean roughness Ra of 1.5 nm or less.

18. The glass plate according to claim 17, wherein the glass plate is manufactured by a float process or a fusion process.

19. A glass plate comprising the alkali-free glass according to claim 1, wherein the glass plate comprises main surfaces and an end surface, at least one side of the glass plate is 1000 mm or more, and a thickness of the glass plate is 0.7 mm or less.

20. A glass substrate for a high-frequency device, comprising the alkali-free glass according to claim 1.

21. A panel antenna comprising the alkali-free glass according to claim 1.

22. A window glass comprising the alkali-free glass according to claim 1.

23. A vehicle window glass comprising the alkali-free glass according to claim 1.

24. A cover glass for a touch panel, comprising the alkali-free glass according to claim 1.

* * * * *